(12) United States Patent
Hu et al.

(10) Patent No.: US 8,144,872 B2
(45) Date of Patent: Mar. 27, 2012

(54) SYSTEM AND METHOD FOR GENERATING ANALOG-DIGITAL MIXED CHAOTIC SIGNAL, ENCRYPTION COMMUNICATION METHOD THEREOF

(75) Inventors: Hanping Hu, Shenzhen (CN); Zuxi Wang, Shenzhen (CN); Xiaogang Wu, Shenzhen (CN); Lin Zhou, Shenzhen (CN); Ziqi Zhu, Shenzhen (CN); Jiwei Wei, Shenzhen (CN); Jie Yang, Shenzhen (CN); Pengyu Lu, Shenzhen (CN); Zhibin Zheng, Shenzhen (CN)

(73) Assignees: Huawei Technologies Co., Ltd., Shenzhen (CN); Huazhong University of Science & Technology, Wuhan (CN)

( * ) Notice: Subject to any disclaimer, the term of this patent is extended or adjusted under 35 U.S.C. 154(b) by 926 days.

(21) Appl. No.: 12/163,744

(22) Filed: Jun. 27, 2008

(65) Prior Publication Data

US 2009/0285395 A1 Nov. 19, 2009

Related U.S. Application Data

(63) Continuation of application No. PCT/CN2006/003724, filed on Dec. 30, 2006.

(30) Foreign Application Priority Data

Dec. 31, 2005 (CN) .......................... 2005 1 0121497

(51) Int. Cl.
*H04L 9/00* (2006.01)
*G06F 21/00* (2006.01)
(52) U.S. Cl. .............. 380/263; 380/28; 380/42; 380/43; 380/44; 380/46; 380/277; 713/400

(58) Field of Classification Search ................... 380/263
See application file for complete search history.

(56) References Cited

U.S. PATENT DOCUMENTS 5,048,086 A * 9/1991 Bianco et al. ................... 380/28
5,379,346 A * 1/1995 Pecora et al. ................. 380/263
(Continued)

FOREIGN PATENT DOCUMENTS

CN 1564504 A 1/2005

OTHER PUBLICATIONS

Lynnyk, V., et al, 'On the Anti-Synchronization Detection for the Generalized Lorenz System and Its Applications to Secure Encryption', Kybernetika—vol. 46(2010), No. 1, pp. 1-18, http://www.utia.cas.cz/files/soutez11/kyber/lynnyk.pdf.*

(Continued)

*Primary Examiner* — Edan Orgad
*Assistant Examiner* — Ronald Baum
(74) *Attorney, Agent, or Firm* — Leydig, Voit & Mayer, Ltd.

(57) ABSTRACT

A system and method for generating analog-digital mixed chaotic signal and an encryption communication method thereof are provided. In the system and method, the complementarity between continuous chaotic systems (12, 22) and digital chaotic systems (11, 21) are reasonably utilized. In specific, the digital chaotic systems, which are separated from each other, control the local continuous chaotic systems respectively, so as to enable the continuous chaotic systems, which are also separated from each other, to stably and synchronously work for a long time. Thus, there is no need to transmit the synchronizing signal, and as a result the anti-attack capability is increased effectively. Further, the continuous chaotic systems disturb the local digital chaotic systems to prevent the digital chaotic systems from degradation. This compensates the drawbacks of digital chaotic systems.

18 Claims, 6 Drawing Sheets

U.S. PATENT DOCUMENTS

| | | | |
|---|---|---|---|
| 5,432,697 A * | 7/1995 | Hayes | 700/38 |
| 5,579,337 A * | 11/1996 | Grinstein et al. | 375/145 |
| 5,655,022 A * | 8/1997 | Carroll | 380/263 |
| 5,680,462 A * | 10/1997 | Miller et al. | 380/263 |
| 5,923,760 A * | 7/1999 | Abarbanel et al. | 380/34 |
| 6,078,665 A * | 6/2000 | Anderson et al. | 380/28 |
| 6,218,973 B1 * | 4/2001 | Barrett et al. | 341/143 |
| 6,363,153 B1 | 3/2002 | Parker et al. | |
| 6,370,248 B1 * | 4/2002 | Carroll et al. | 380/263 |
| 6,744,893 B1 * | 6/2004 | Fleming-Dahl | 380/263 |
| 6,882,689 B2 * | 4/2005 | Maggio et al. | 375/259 |
| 6,980,656 B1 * | 12/2005 | Hinton et al. | 380/263 |
| 6,981,010 B1 | 12/2005 | Balkir et al. | |
| 6,999,445 B1 * | 2/2006 | Dmitriev et al. | 370/342 |
| 7,139,397 B2 * | 11/2006 | Messina et al. | 380/46 |
| 7,587,047 B2 * | 9/2009 | Crandall et al. | 380/46 |
| 7,839,939 B2 * | 11/2010 | Lee et al. | 375/259 |
| 2002/0172291 A1 | 11/2002 | Maggio et al. | |

OTHER PUBLICATIONS

Götz et al., Discrete-Time Chaotic Encryption Systems—Part I: Statistical Design Approach, *IEEE Transactions on Circuits and Systems—1: Fundamental Theory and Applications*, 44(10): 963-970 (Oct. 1997).

Zhao et al.; Classification of Chaos-Based Communication and Chaotic Secure Technique Research; Nature Magazine; Jan. 2003; pp. 21:30; ; vol. 1, No. 1.

Zhou et al., "A New Idea of Using One-Dimensional PWL Map in Digital Secure Communications—Dual-Resolution Approach," Oct. 2000, vol. 47 No. 10, IEEE Circuits and Systems Society, Piscataway, New Jersey.

"Realizing Finite Precision Chaotic Systems via Perturbation of m-Sequences," Jul. 1997, vol. 25, No. 7, Acta Electronica Sinica, China.

Written Opinion of the International Searching Authority in corresponding PCT Application No. PCT/CN2006/003724 (Apr. 12, 2007).

* cited by examiner

SYSTEM AND METHOD FOR GENERATING ANALOG-DIGITAL MIXED CHAOTIC SIGNAL, ENCRYPTION COMMUNICATION METHOD THEREOF

CROSS-REFERENCE TO RELATED APPLICATIONS

This application is a continuation of International Patent Application No. PCT/CN2006/003724, filed Dec. 30, 2006, which claims priority to Chinese Patent Application No. 200510121497.3, entitled "System and Method for Generating Analog-digital Mixed Chaotic Signals", filed Dec. 31, 2005, both of which are hereby incorporated by reference for their entirety.

FIELD OF THE INVENTION

The present invention relates to cryptography technology in information security field, and more particularly, to a system and method for generating analog-digital mixed chaotic signals as well as an encryption communication method.

BACKGROUND

With the development of computer, communication and network technology, the progress of global informationization is speeding up. Up to now, network information system has become an infrastructure for countries, industries, groups and enterprises under development. The communication security of the network information system has therefore become an important issue associated with the continuous and stable development of economy and the safety of a country.

At present, chaos has been applied in the secure communication field. The so-called chaos refers to a complex external manifestation resulted from its internal randomicity. In other words, the chaos is a kind of non-random movements that appears to be random. The chaotic signals are characterized by ergodicity, wideband, noise like, sensitive to the initial conditions, rapidly attenuated self correlation and weak cross correlation, and the like. These characteristics provide numerous mechanisms and methods to achieve secure communication. The Chaotic Encryption System in the art includes digital chaotic system and continuous (or analog) chaotic system.

The digital chaotic system is less affected by noise interference and device parameters, and thereby it is easy to run stably for a long time and may be duplicated accurately. However, because digital chaotic sequences are all generated on computers or other equipment with limited precision, any digital chaotic sequence generator may be classified into a finite automation. In this case, the generated digital chaotic sequence presents degraded characteristics, such as short period, strong correlation and small linear complexity; in other words, the dynamics characteristics of a real digital chaotic system are much different from those of ideal real-value chaotic system.

Compared with the digital chaotic system, the continuous chaotic system (i.e. analog chaotic system) has a continuous state (for example, voltage, current etc.) space, which allows the generated chaotic sequences to have a good cryptology characteristic. However, due to the effects of the deviation of device parameters and the circuit noise, it is hard to achieve a stable synchronization between two continuous chaotic systems for a long time. This severely slows the progress of practical application of the chaotic synchronization based secure communication system.

SUMMARY

Various embodiments of the invention provide a system and method for generating analog-digital mixed chaotic signal as well as an encryption communication method thereof, in which the problem of characteristic degradation is not tended to occur in the digital chaotic system, and the continuous chaotic system is capable of running stably and synchronously for a long time.

One embodiment of the invention provides an analog-digital mixed chaotic system, including:

a digital chaotic system adapted to generate a digital chaotic sequence;

a continuous chaotic system adapted to generate a continuous chaotic signal;

a synchronization coupling module adapted to generate a synchronizing impulse signal to the continuous chaotic system for controlling the continuous chaotic system, according to states of the digital chaotic system and the continuous chaotic system, and output the synchronizing impulse signal to the continuous chaotic system;

a disturbance coupling module adapted to disturb the digital chaotic system according to the state of the continuous chaotic system; and a controlling module adapted to control the states of the digital chaotic system, the continuous chaotic system, the synchronization coupling module and the disturbance coupling module.

Another embodiment of the invention provides a method for generating an analog-digital mixed chaotic signal, including:

generating a digital chaotic sequence from a digital chaotic system;

generating a continuous chaotic signal from a continuous chaotic system;

generating a synchronizing impulse signal for controlling the continuous chaotic system according to states of the digital chaotic system and the continuous chaotic system, and outputting the synchronizing impulse signal to the continuous chaotic system; and disturbing the digital chaotic system according to the state of the continuous chaotic system.

Yet another embodiment of the invention provides an encryption communication system, comprising a transmitting party, and a receiving party configured to communicate with the transmitting party, wherein a first analog-digital mixed chaotic system included in the transmitting party is configured to encrypt a plaintext to be transmitted by using a chaotic signal generated by itself, and outputting a resultant cipher text; and a second analog-digital mixed chaotic system included in the receiving party is configured to decrypt a received cipher text by using a chaotic signal generated by itself, and outputting a resultant plaintext; and the system is wherein: initial conditions and system parameters of the digital chaotic systems in the first and the second analog-digital mixed chaotic systems are substantially the same, and the first and the second analog-digital mixed chaotic systems according to the one embodiment of present invention.

Embodiments of the invention utilize the complementarity, in terms of the cryptography characteristics and the implementation technology, between a digital chaotic system and a chaotic synchronization based secure communication system. In these embodiments, the digital chaotic systems, which are separated from each other in location, control their own local continuous chaotic systems respectively, so that both of the separated continuous chaotic systems may run in a stable and synchronous state for a long time without transmitting synchronizing signals. This effectively enhances anti-attack ability of a chaotic system. Also in these embodiments, the continuous chaotic systems in turn disturb the respective local digital chaotic system to prevent the digital chaotic systems from characteristic degradation. Therefore, in the analog-digital mixed chaotic system, the shortcomings that the continuous chaotic systems cannot run in a stable and synchronous state for a long time and thereby the synchronizing signals need to be transmitted through a channel can be overcome, and meanwhile, the problem, i.e. the characteristic degradation of digital chaotic systems can be avoided.

BRIEF DESCRIPTION OF THE DRAWING(S)

The present invention will be further described in conjunction with the figures and embodiments as follows, in which.

Figure 9:
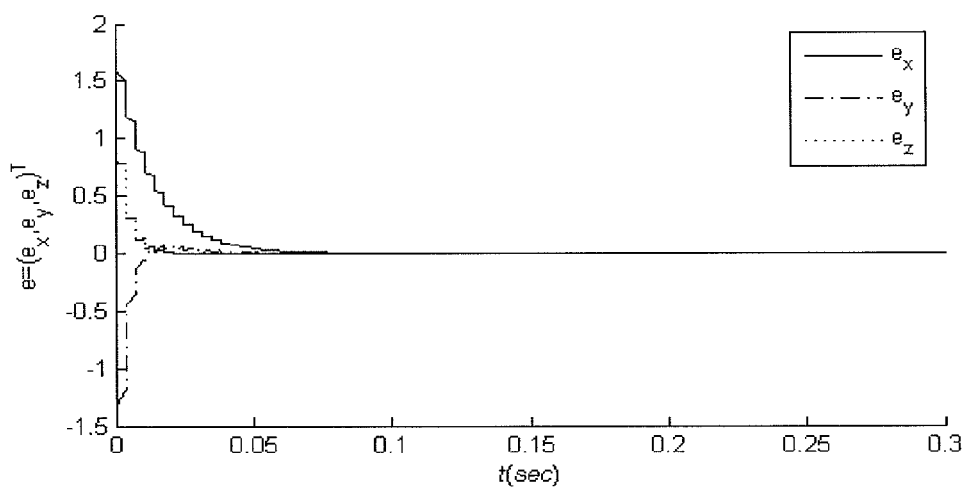
Figure 10:
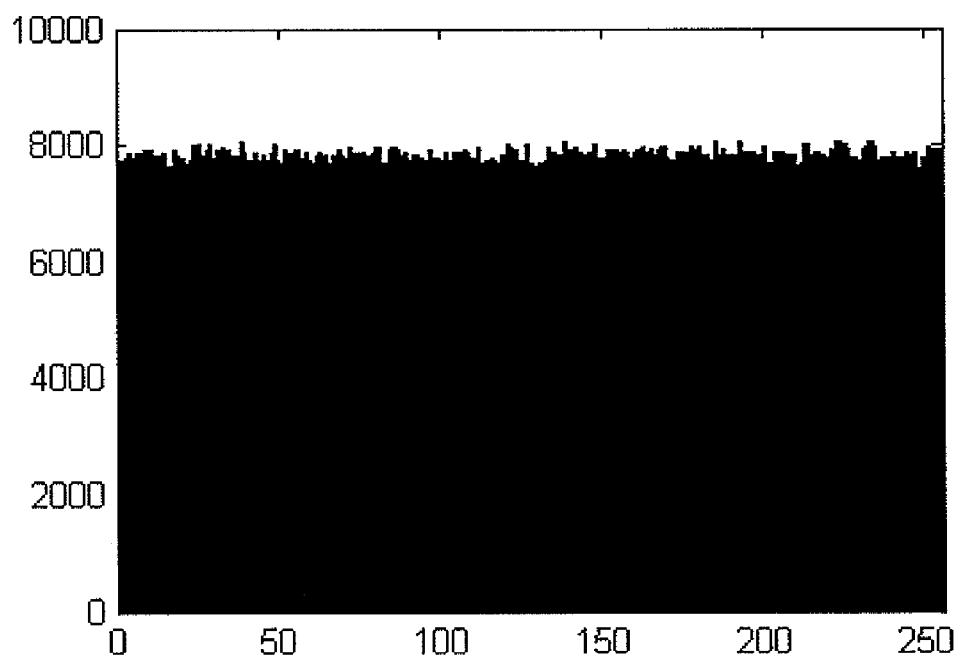

FIG. 9 is a schematic view showing errors between the state variables of the continuous Lorenz chaotic systems 1 and 2; and FIG. 10 is a schematic view of the distribution of the 2,000,000 keys generated by the analog-digital mixed chaotic system.

DETAILED DESCRIPTION

Figure 1:
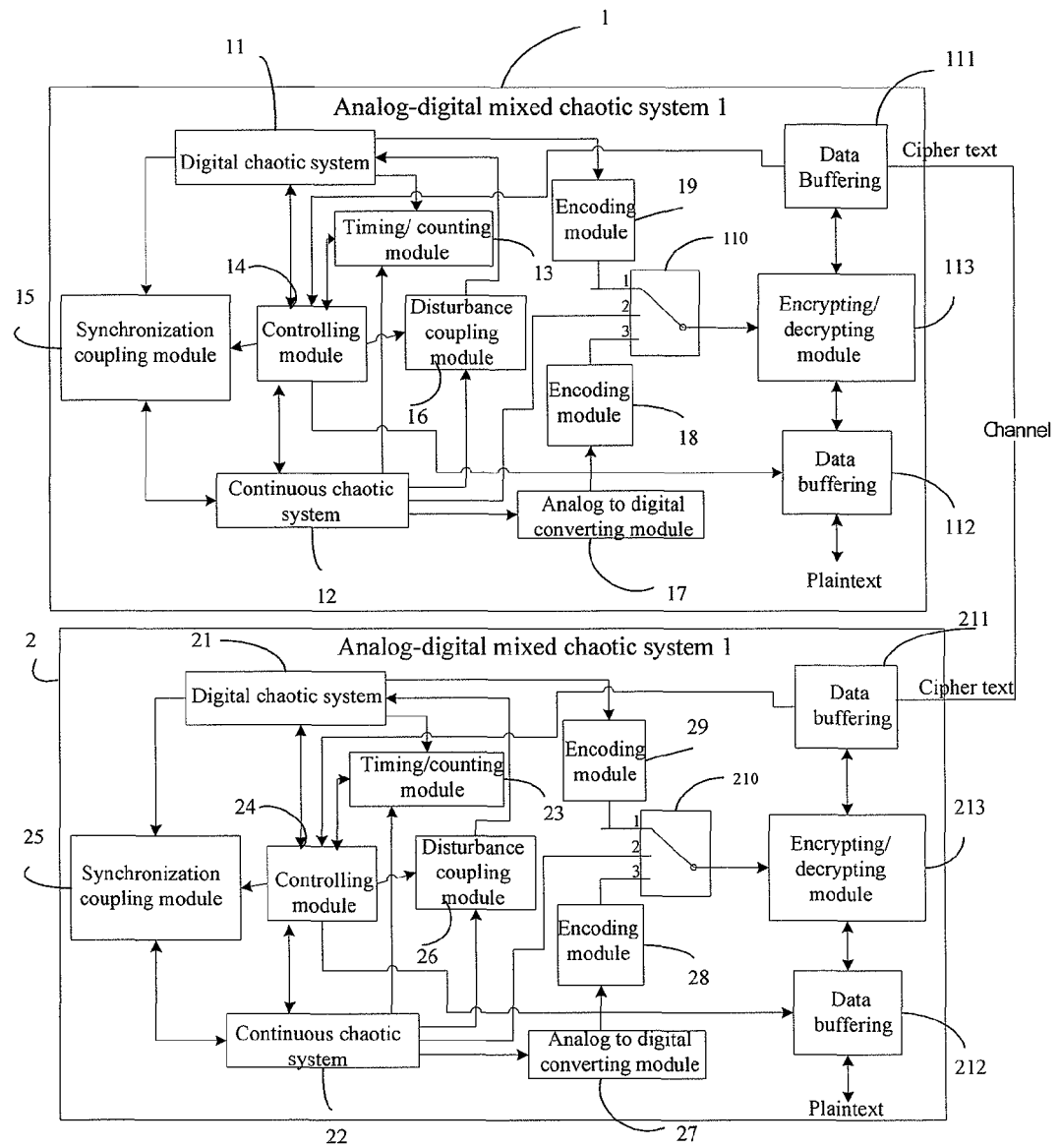
FIG. 1 is a schematic diagram of an analog-digital mixed chaotic system according to an embodiment of the present invention.

FIG. 1 shows a secure communication system according to an embodiment of the present invention, in which two analog-digital mixed chaotic systems 1 and 2 are separated from each other.

The analog-digital mixed chaotic system 1 includes a digital chaotic system 11, a continuous chaotic system 12, a timing/counting module 13, a controlling module 14, a synchronization coupling module 15, a disturbance coupling module 16, an analog to digital (A/D) converting module 17, encoding modules 18 and 19, a multiplexing switch 110, data buffering modules 111 and 112, and a encrypting/decrypting module 113, and the like.

The analog-digital mixed chaotic system 2 includes a digital chaotic system 21, a continuous chaotic system 22, a timing/counting module 23, a controlling module 24, a synchronization coupling module 25, a disturbance coupling module 26, an A/D converting module 27, encoding modules 28 and 29, a multiplexing switch 210, data buffering modules 211 and 212, and a encrypting/decrypting module 213, and the like.

Here, the digital chaotic systems 11 and 21 may be represented by a difference equation of a continuous chaotic system with finite precision, or a discrete chaotic system with other finite precision. The dynamics characteristics of the digital chaotic systems 11 and 21 may be expressed as the following equation (1):

$$X_j(i+1) = G(X_j(i)) \ i=0, 1, 2, \ldots; j=1,2 \quad (1)$$

where, j=1, 2 denotes the digital chaotic systems 11 and 21 respectively, $X_j(i)$ denotes a m-dimensional state variable of the digital chaotic system, in which $X_1(0)$ and $X_2(0)$ represent the initial conditions of the digital chaotic systems 11 and 21, respectively, and $X_1(0)=X_2(0)$.

The digital chaotic systems 11 and 21 generate an output every time after $\Delta_s'$ times of iterations are completed. It is assumed that $T_1$ and $T_2$ are the respective time required for the digital chaotic systems 11 and 21 to execute one iteration. For simplicity, given that $T_1 < T_2$ without losing universality, the transmitting and receiving parties may take $T_2$ as the time required for each of digital chaotic systems 11 and 21 to execute one iteration.

Since the initial conditions and system parameters of the digital chaotic systems 11 and 21 are identical to each other, the digital chaotic systems 11 and 21 can be completely synchronized. Here, in order to ensure that the continuous chaotic systems 12 and 22 can be synchronized even in the case that a data transmission delay occurs and the respective time required for one iteration of the digital chaotic systems 11 and 21 is inconsistent, the operating states of the digital chaotic systems 11 and 21 may be classified into a running state (i.e. iterative computing state) and a holding state.

The dynamics characteristics of the continuous chaotic systems 12 and 22 may be expressed by the following equation (2):

$$\frac{d}{dt}\tilde{X}_j(t) = A \cdot \tilde{X}_j(t) + \Phi(\tilde{X}_j(t)), \quad (2)$$

where, j=1,2 denotes the continuous chaotic systems 12 and 22 respectively, $\tilde{X}_j(t)$ is a n-dimensional state variable of the continuous chaotic system, in which $\tilde{X}_1(0)$ and $\tilde{X}_2(0)$ are initial conditions of the continuous chaotic systems 12 and 22, respectively, A is a constant matrix of order n, and $\Phi: R^n \rightarrow R^n$ is a function for describing the nonlinear component of the continuous chaotic system.

Also, in order to ensure that the continuous chaotic systems 12 and 22 may be synchronized even in the case that a data transmission delay occurs and the respective time required for one iteration of the digital chaotic systems 11 and 21 is inconsistent, the operating states of the continuous chaotic systems 12 and 22 may be classified into a running state and a holding state as well.

The timing/counting modules 13 and 23 of FIG. 1 have the following functions:

Firstly, the timing/counting modules 13 and 23 may record the times of iterations of the digital chaotic systems 11 and 21, respectively.

Figure 2:
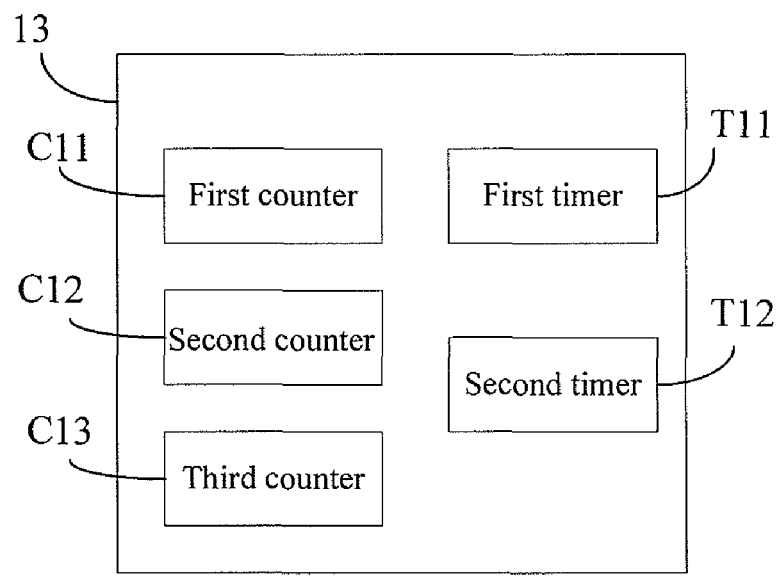
FIG. 2 is a block diagram of one timing/counting module as shown in FIG. 1 according to an embodiment of present invention.
Figure 3:
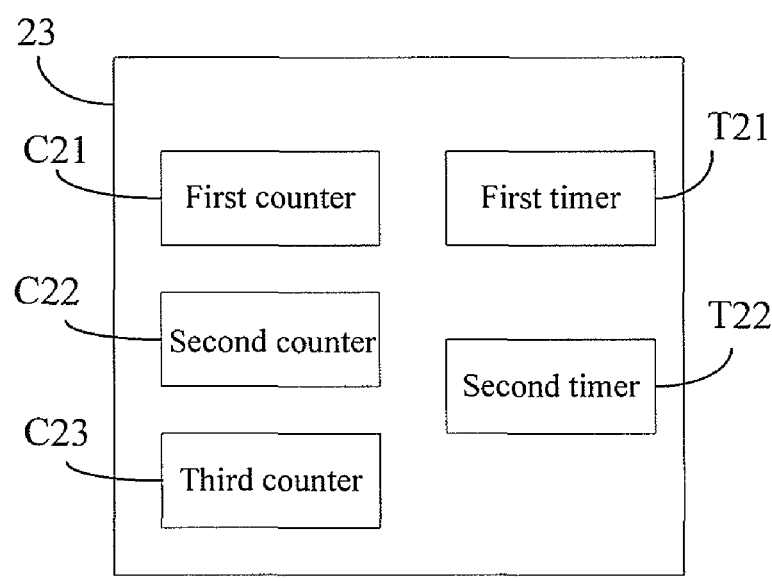
FIG. 3 is a block diagram of the other timing/counting module as shown in FIG. 1 according to an embodiment of present invention.

By reference to FIGS. 2 and 3, three counters are provided in each of the timing/counting modules 13 and 23, i.e. C11, C12, C13 and C21, C22 and C23. The counters C11 and C21 provide the respective local controlling modules 14 and 24 with control signals for controlling the output of the digital chaotic systems 11 and 21, respectively. The counters C12 and C22 provide the respective local controlling modules 14 and 24 with control signals for controlling the digital chaotic systems 11 and 21 to output state values to the synchronization coupling modules 15 and 25, respectively. The counters C13 and C23 provide the respective local controlling modules 14 and 24 with control signals for controlling the disturbance coupling modules 16 and 26 to disturb the digital chaotic systems 11 and 21, respectively.

Secondly, the timing/counting modules 13 and 23 may record the durations for which the continuous chaotic systems 12 and 22 stay in the continuous running state (i.e. running time of the continuous chaotic system) respectively.

By reference to FIGS. 2 and 3, two timers are provided in each of the timing/counting modules 13 and 23, i.e., timers T11, T12 and T21, T22. The timers T11 and T21 provide the respective local controlling modules 14 and 24 with control signals for controlling the synchronization coupling modules 15 and 25 to output synchronized impulses, respectively. The timers T12 and T22 provide the respective local controlling modules 14 and 24 with control signals for controlling the disturbance coupling modules 16 and 26 to sample the continuous chaotic systems. It should be clarified that: the timers may record the running time of the continuous chaotic system, that is, the timers in the timing/counting modules 13 and 23 suspend when the continuous chaotic systems stay in a holding state. Therefore, with regard to the running time, the duration for which the above-mentioned synchronizing impulse is applied to the continuous chaotic system is $\Delta_1$, and the period of the sampling control signal is $\Delta_2$.

The controlling modules 14 and 24 of FIG. 1 have the following functions:

Firstly, the controlling modules 14 and 24 may control respective local digital chaotic systems 11 and 21 to initiate each key generation process, and control respective local digital chaotic systems 11 and 21 to complete each key generation process, according to the states of the respective local data buffering modules 111, 112 or 211, 212 and the signals from the counters C11 and C21 in the timing/counting modules 13 and 23.

Secondly, the controlling modules 14 and 24 may control the output of the respective local digital chaotic systems 11 and 21 to the respective local synchronization coupling modules 15 and 25, according to the signals from the counters C12 and C22 in the respective local timing/counting modules 13 and 23.

Thirdly, the controlling modules 14 and 24 may control the time at which the synchronization coupling modules 15 and 25 output the synchronizing impulse signals, according to the signals from the timers T11 and T21 in the respective local timing/counting modules 13 and 23, so that the continuous chaotic systems 12 and 22 may realize stable chaotic synchronization, without transmitting the synchronizing impulse signals.

Fourthly, the controlling modules 14 and 24 may control the time at which the disturbance coupling modules 16 and 26 sample the respective local continuous chaotic systems 12 and 22, according to the signals from the timers T11 and T21 in the respective local timing/counting modules 13 and 23.

Fifthly, the controlling modules 14 and 24 may control the time at which the disturbance coupling modules 16 and 26 output the disturbing signals, according to the signals from the counters C13 and C23 in the respective local timing/counting modules 13 and 23, so that the digital chaotic systems 11 and 21 can overcome the problem of characteristic degradation.

It can be seen from the above, the controlling modules 14 and 24 may control the operating states of respective local digital chaotic systems 11 and 21 and the operating states of respective local continuous chaotic systems 12 and 22, according to the signals from all the counters and timers in the respective local timing/counting modules 13 and 23. Further, the controlling modules 14 and 24 may control data rate of the dataflow inputted into the data buffers, according to the states of respective local data buffers.

Under control of the controlling modules 14 and 24 of FIG. 1, the synchronization coupling modules 15 and 25 generate synchronizing impulse signals, according to the state values inputted by the respective local digital chaotic systems and current state values of the respective local continuous chaotic systems, and control the respective local continuous chaotic systems 12 and 22 synchronously according to the synchronizing impulse signal, so that a stable chaotic synchronization may be achieved between the separated continuous chaotic systems 12 and 22 without transmitting the synchronizing impulse signals.

The synchronization coupling modules 15 and 25 may be adapted to realize the synchronization between the separated continuous chaotic systems 12 and 22 according to the following mathematical model (3):

$$\Delta \tilde{X}_j|_{t=t_k} = -B \cdot (W(C(X_j(n_k))) - \tilde{X}_j(t_k)), k=1, 2, \ldots, \quad (3)$$

where, j=1,2 denotes the synchronization coupling modules 15 and 25 respectively;

B is a diagonal matrix of order n;

$t_k$ denotes the time at which the synchronization coupling modules 15 and 25 output the synchronizing impulse signal, and $t_k = k \cdot \Delta_1$;

$\tilde{X}_j(t_k)$ denotes state values of the continuous chaotic systems 12 and 22 at the time $t=t_k$;

$n_k$ denotes the times of iterations when the digital chaotic systems 11 and 21 output state values to the respective local synchronization coupling modules 15 and 25;

$X_j(n_k)$ denotes state values of the digital chaotic systems 11 and 21 at $i=n_k$;

C(•) is a function for converting binary state values of the digital chaotic systems 11 and 21 into decimal state values (i.e. to realize digital to analog conversion), and W(•) is function for mapping an independent variable from an m-dimension space to a n-dimension space.

At the transmitting and receiving parties, it is required to construct, according to a criterion for keeping stable synchronization between the continuous chaotic systems 12 and 22, a matrix B for adjusting the error magnitude between $W(C(X_j(n_k)))$ and $\tilde{X}_j(t_k)$. Further, it is required to determine the time $t_k$ at which the synchronization coupling modules 15 and 25 output the synchronizing impulse signal, and to synchronously control the respective local continuous chaotic systems. In this way, a stable chaotic synchronization can be achieved between the separated continuous chaotic systems 12 and 22, without transmitting the synchronizing impulse signals therebetween.

Under control of the controlling modules 14 and 24 of FIG. 1, the disturbance coupling modules 16 and 26 respectively sample the states of the respective local continuous chaotic systems 12 and 22, and output the sampled states to the respective local digital chaotic systems 11 and 21 after a conversion of a disturbance coupling function, so as to prevent characteristic degradation of the digital chaotic systems 11 and 21, respectively.

The disturbance coupling modules 16 and 26 may prevent characteristic degradation of the digital chaotic systems 11 and 12 according to the following mathematical model (4):

$$X_j(i+1) = G(X_j(i)) + H(i, D(\tilde{X}_j(\tau_k))) \quad i = 0, 1, 2, \ldots \quad (4)$$

$$H(i, D(\tilde{X}_j(\tau_k))) = \begin{cases} 0 & i \bmod \Delta_3' \neq 0 \text{ or } i < k \\ H(i, D(\tilde{X}_j(\tau_k))) & i \bmod \Delta_3' = 0 \text{ and} \\ & i \geq K, k = \left\lfloor \frac{i-K}{\Delta_3'} \right\rfloor \end{cases}$$

where, j=1,2 denotes the disturbance coupling modules 16 and 26 respectively;

$\tilde{X}_j(\tau_k)$ (j=1,2) indicates state value of each the continuous chaotic systems 12 and 22 at the time of $t=\tau_k$ (i.e. the sample value obtained by sampling the individual local continuous chaotic systems 12 and 22 at the time of $t=\tau_k$ by each of the disturbance coupling modules 16 and 26, where $\tau_k = k \cdot \Delta_2$);

D(•) is a function for converting a decimal sample value into a binary sample value with finite precision, K is a predetermined positive integer, and $\Delta_3'$ indicates a predetermined number of times of iterations, and H(•) is a disturbance coupling function, which disturbs the digital chaotic systems every time that $\Delta_3'$ times of iterations are completed in the digital chaotic systems 11 and 21.

At the transmitting and receiving parties, it is required to construct the disturbance coupling function H(•) according to the characteristics of the continuous chaotic systems 12 and 22 and the characteristic degradation property of the digital chaotic systems 11 and 21. Further, it is required to determine the time $t_k$ (i.e. sampling clock period $\Delta_2$) at which the continuous chaotic systems is to be sampled, and the times of iterations $\Delta_3'$ for disturbing the respective local digital chaotic systems, so that the statistical characteristic of the disturbance coupling function H(•) may approach to a probability distribution that truncation error of a digital chaotic system follows, with probability 1 in a certain precision. Therefore, the characteristic degradation caused by the finite precision effect may be overcome in the digital chaotic systems affected by the disturbed signal.

The A/D converting modules 17 and 27 of FIG. 1 convert the continuous chaotic signals generated by the respective local continuous chaotic systems 12 and 22 into digital chaotic sequences.

The encoding modules 18, 19 and 28, 29 of FIG. 1 encode the respective local digital chaotic sequences.

The multiplexing switches 110 and 210 of FIG. 1 select one of the following sequences: the digital chaotic sequences generated by from the digital chaotic systems 11 and 21, the continuous (analog) chaotic signals generated by the continuous chaotic systems 12 and 22, and the digital chaotic sequences obtained by A/D converting the output of the continuous chaotic systems 12 and 22, as the output of the analog-digital mixed chaotic system. The digital chaotic sequence generated by the system may be adapted to encode the data as either a pseudorandom number sequence or a key stream. The continuous (analog) chaotic signals generated by the system can be adapted to design a chaotic synchronization based secure communication system.

The data buffering modules 111, 112 and 211, 212 of FIG. 1 are adapted to buffer the respective local plaintext and cipher text, respectively.

The encrypting/decrypting modules 113 and 213 of FIG. 1 are adapted to encrypt/decrypt the data inputted into the respective local data buffers. The encrypting/decrypting modules may encrypt/decrypt digital signals by using the encoded digital chaotic sequences, or may realize chaotic synchronization based secure communication by using the continuous (analog) chaotic signals generated by the continuous chaotic systems.

In the analog-digital mixed chaotic systems 1 and 2, the controlling modules 14 and 24 control the respective local digital chaotic systems, the continuous chaotic systems, the synchronization coupling modules, the disturbance coupling module and the data buffers, according to the various clock signals and control signals provided by the timing/counting modules 13 and 23.

Next, the main timing for running the analog-digital mixed chaotic system 1 will be illustrated by taking an example in which the system 1 encrypts a data signal.

Figure 4:
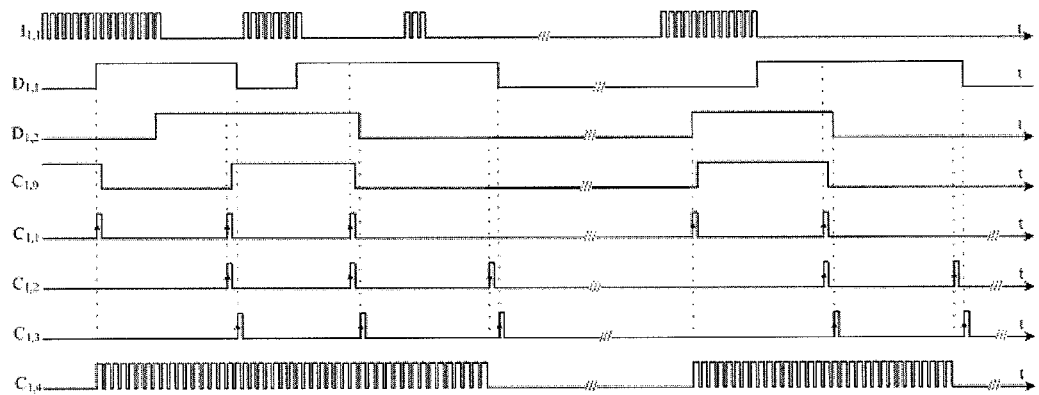
FIG. 4 is a schematic view of a main timing for running the analog-digital mixed chaotic system shown in FIG. 1.
Figure 5:
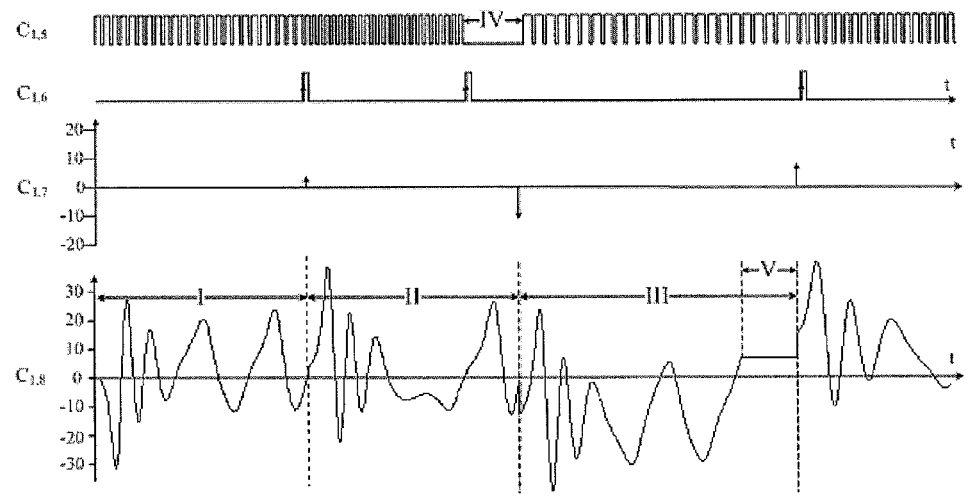
FIG. 5 is a schematic view of a main timing for running the synchronization coupling module shown in FIG. 1.
Figure 6:
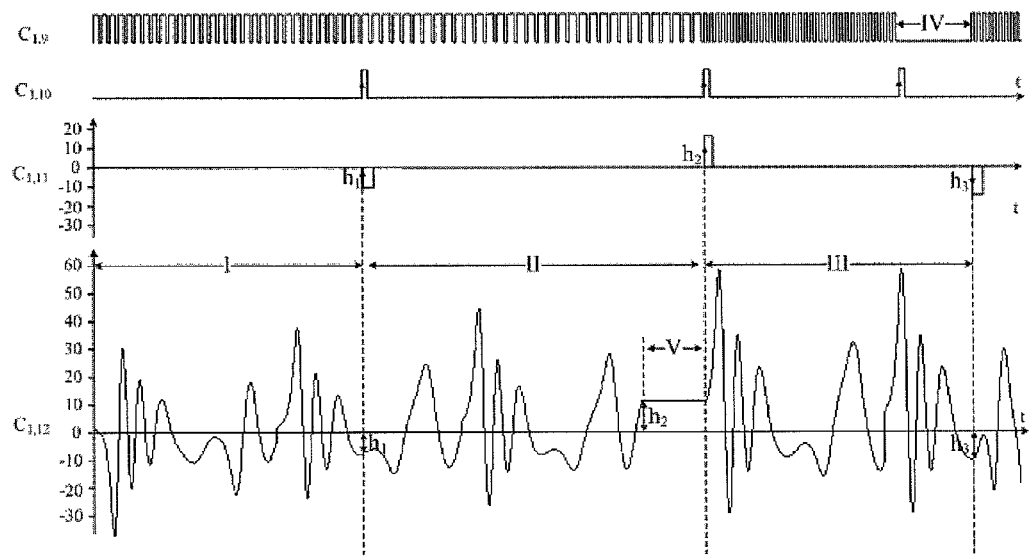
FIG. 6 is a schematic view of a main timing for running the disturbance coupling module shown in FIG. 1.

In FIGS. 4, 5 and 6, signals $I_{1,1}$, $D_{1,1}$, $D_{1,2}$, $C_{1,0}$, $C_{1,1}$, $C_{1,2}$, $C_{1,3}$, $C_{1,4}$, $C_{1,5}$, $C_{1,6}$, $C_{1,7}$, $C_{1,8}$, $C_{1,9}$ respectively indicate the following meanings:

(1) $I_{1,1}$ indicates the input data stream, where each impulse indicates that one bit of data is inputted into the data buffering module 112 of the analog-digital mixed chaotic system 1.

(2) $D_{1,1}$ and $D_{1,2}$ indicate whether data in the two buffers B11 and B12 of the data buffering module 112 is ready, respectively. If data in a buffer is ready, a state flag of the buffer is set to "1", otherwise, the state flag of the buffer is set to "0". If a state flag of a buffer is "1", new data is prohibited to be inputted into this buffer, and if the state flag is "0", new data is allowed to be inputted into this buffer. Moreover, when data within the above buffer is encrypted/decrypted, the corresponding state flag will be set to "0".

(3) $C_{1,0}$ indicates the data of which buffers will be processed by the analog-digital mixed chaotic system 1. Data in the buffer B11 will be processed by the analog-digital mixed chaotic system 1 if $C_{1,0}$ is "1", and data in the buffer B12 will be processed if $C_{1,0}$ is (4) $C_{1,1}$ indicates that the digital chaotic system 11 starts a process of generating one element of a chaotic sequence.

(5) $C_{1,2}$ indicates that the digital chaotic system 11 ends a process of generating one element of the chaotic sequence. If data in the buffer is not ready, the digital chaotic system 11 suspends the process of generating the next element of the chaotic sequence, and if data in the buffer is ready, the digital chaotic system 11 starts the process of generating the next element of the chaotic sequence automatically.

(6) $C_{1,3}$ indicates that all of the data in the buffer has been processed.

(7) Each impulse of $C_{1,4}$ corresponds to the completion of one iteration in the digital chaotic system 11.

(8) $C_{1,5}$ indicates that the digital chaotic system 11 outputs a state value to the synchronization coupling module 15 every time after $\Delta_4'$ times of iterations are completed.

(9) $C_{1,6}$ indicates the output of the synchronization coupling module 15. With respect to the definition of running time, the duration for which the synchronization coupling module 15 output the synchronizing impulse is $\Delta_1$.

(10) $C_{1,7}$ indicates the output of the continuous chaotic system 12.

(11) $C_{1,8}$ indicates the control to the digital chaotic system 11. The digital chaotic system 11 executes $\Delta_3'$ times of iterations within two adjacent impulses.

(12) $C_{1,9}$ indicates that the disturbance coupling module 16 samples the continuous chaotic system 12. The period for the disturbance coupling module 16 to sample the continuous chaotic system 12 is $\Delta_2$, with respect to the definition of running time.

The running timing of the analog-digital mixed chaotic system 1 is shown as follows:

In FIG. 4, when signal $C_{1,0}$ is "1", the analog-digital mixed chaotic system 1 processes the data in buffer B11. The input data $I_{1,1}$ continually arrive at the analog-digital mixed chaotic system 1. When the data in the buffer B11 are ready, the state signal $D_1$ changes from "0" to "1". At the rising edge of the state signal $D_1$, the starting signal $C_{1,1}$ of the digital chaotic system 11 is generated, and thereby the digital chaotic system 11 starts to execute iteration with the signal $C_{1,0}$ changing from "1" to "0". Under the trigger of the rising edge of the state signal $D_1$, the timers T11, T12 and the counters C11, C12, C13 in the timing/counting module 13 begin timing and counting. When the timer C11 records that the digital chaotic system 11 has completed $\Delta_5'$ times of iterations, the counter C11 generates a completion signal (shown as $C_{1,2}$ in FIG. 4), and the counter C11 is reset. Under the trigger of the rising edge of the signal $C_{1,2}$, the digital chaotic system 11 outputs a key for encryption. The analog-digital mixed chaotic system 1 processes the data in the buffer B11 with the encryption key generated by the digital chaotic system 11. When all of the data in the buffer B11 has been processed, a completion signal (shown as $C_{1,3}$ in FIG. 4) is generated, and the state signal $D_1$ of buffer B11 is set to 0. At this time, the buffer B11 enters a data preparation period.

When signal $C_{1,0}$ is "0", the analog-digital mixed chaotic system 1 processes the data in buffer B12. If the state signal $D_2$ (shown as $D_2$ in FIG. 2(a)) of the buffer B12 is "1", the starting signal restarts the digital chaotic system 11 when the counter C11 generates the completion signal, the counter C11 resumes counting, and thereby the digital chaotic system 11 enters a process of generating the next key, meanwhile the signal $C_{1,0}$ changes from "0" to "1". The timers T11, T12 and the counters C12, C13 continues timing and counting. If the state signal $D_2$ of the buffer B12 is "0", the digital chaotic system 11 and the continuous chaotic system 12 stay in a holding state when the counter C11 generates a completion signal, and meanwhile, the timers T11, T12 and the counters C12, C13 stop timing and counting.

In FIG. 5, it is assumed that, in normal conditions, the time required for the digital chaotic system 11 to complete an iterative computation is $T_2$. In this case, when the counter C12 records that the digital chaotic system 11 has completed $\Delta_4'$ times of iterations, the running time $\Delta_1$ of the continuous chaotic system recorded by the timer T11 is just $T_2 \cdot \Delta_4'$ (shown as segment I in FIG. 4). At this time, the digital chaotic system 11 outputs a state value to the synchronization coupling module 15 under control of the controlling module 14, the synchronization coupling module 15 outputs and applies a synchronizing impulse to the continuous chaotic system 12 under control of the controlling module 14, and the counter C12 and the timer T11 are reset.

In actual situation, because of the effect of outer conditions such as running environment on the digital chaotic system 11, the time required for executing each iteration may be not $T_2$. Therefore, when the counter C12 records that the digital chaotic system 11 has completed $\Delta_4'$ times of iterations, the running time $\Delta_1$ of the continuous chaotic system 12 may be less than $T_2 \cdot \Delta_4'$ (shown as segment II in FIG. 5), and thus the digital chaotic system 11 is required to stay in the holding state after the $\Delta_4'$ times of iterations, until the running time $\Delta_1$ of the continuous chaotic system 12 arrives $T_2 \cdot \Delta_4'$. Once the running time $\Delta_1$ of the continuous chaotic system 12 arrives $T_2 \cdot \Delta_4'$, the digital chaotic system 11 leaves the holding state, the synchronization coupling module 15 outputs and applies the synchronizing impulse to the continuous chaotic system 12, and then the counter C12 and the timer T11 are reset.

When the running time $\Delta_1$ of the continuous chaotic system 12 arrives $T_2 \cdot \Delta_4'$, the digital chaotic system 11 has not completed the $\Delta'$ times of iterations (shown as segment III in FIG. 5). In this case, the continuous chaotic system 12 is required to stay in the holding state after the running time $\Delta_1$ arrives $T_2 \cdot \Delta_4'$, until the digital chaotic system 11 completes the $\Delta_4'$ times of iterations. When the digital chaotic system 11 has completed $\Delta_4'$ times of iterations, the continuous chaotic system 12 leaves the holding state, the synchronization coupling module 15 outputs and applies the synchronizing impulse to the continuous chaotic system 12 to synchronously control the continuous chaotic system, and then the counter C12 and the timer T11 are reset.

In FIG. 6, it is assumed that, in normal conditions, the time required for executing one iteration is $T_2$. When the counter C13 records that the digital chaotic system 11 has completed $\Delta'$ times of iterations, the running time $\Delta_2$ of the continuous chaotic system 12 recorded by the timer T12 is just $T_2 \Delta_3'$ (shown as segment I in FIG. 6). At this time, the disturbance coupling module 15 samples the continuous chaotic system 12 (shown as $C_{1,9}$ in FIG. 6) and converts the sampled values, under control of the controlling module 14, and outputs a disturbing signal to the digital chaotic system 11 to disturb the digital chaotic system 11, and then the counter C13 and the timer T12 are reset.

In actual situation, because of the effect of outer conditions such as running environment on the digital chaotic system 11, the time required for executing each iteration may be not $T_2$. Therefore, when the running time $\Delta_2$ of the continuous chaotic system 12 arrives $T_2 \cdot \Delta_3'$, the digital chaotic system 11 has not completed $\Delta_3'$ times of iterations (shown as segment II in FIG. 6). In this case, continuous chaotic system 12 should stay in the holding state after the running time $\Delta_2$ arrives $T_2 \cdot \Delta_3'$, until the digital chaotic system 11 completed $\Delta_3'$ times of iterations. When the digital chaotic system 11 has completed $\Delta_3'$ times of iterations, the continuous chaotic system 12 leaves the holding state, the disturbance coupling module 15 samples the continuous chaotic system 12 (shown as $C_{1,9}$ in FIG. 6) and converts the sampled values under control of the controlling module 14, and outputs a disturbing signal to the digital chaotic system 11 to disturb the digital chaotic system 11, and then the counter C13 and the timer T12 are reset.

When the counter C13 records that the digital chaotic system 11 has completed $\Delta_3'$ times of iterations, the running time $\Delta_2$ of the continuous chaotic system 12 is less than $T_2 \cdot \Delta_3'$ (shown as segment III in FIG. 6). In this case, the digital chaotic system 11 should stay in the holding state after completing $\Delta_3'$ times of iterations, until the running time $\Delta_2$ of the continuous chaotic system 12 arrives $T_2 \cdot \Delta_3'$. When the running time $\Delta_2$ of the continuous chaotic system 12 arrives $T_2 \cdot \Delta_3'$, the digital chaotic system 11 leaves the holding state, the disturbance coupling module 15 samples the continuous chaotic system 12 (shown as $C_{1,9}$ in FIG. 6) and converts the sampled values under control of the controlling module 14, and outputs a disturbing signal to the digital chaotic system 11 to disturb the digital chaotic system 11, and then the counter C13 and the timer T12 are reset.

A criterion for holding a stable synchronization between the continuous chaotic systems 12 and 22 is illustrated as below.

(1) Given that B is a diagonal matrix of order n, I is an identity matrix of order n, d is the largest Eigenvalue of matrix $(I+B)^T \cdot (I+B)$, q is the largest Eigenvalue of $(A+A^T)$, and L is a local Lipschitz constant of the nonlinear mapping $\Phi$ in equation (2). The digital chaotic systems 11 and 21 output their state values to the respective local synchronization coupling modules 15 and 25 every time that $\Delta_4'$ times of iterations are completed. When the duration $\Delta_1$ for which the synchronization coupling modules 15 and 25 output the synchronizing impulse signal meets the criterion of:

$$\Delta_1 = \Delta_4' \cdot T_2 \quad (5)$$

and $$(q+2L)\cdot\Delta_1 \leq -1n(\xi\cdot d) \; \xi > 1, d < 1 \quad (6a),$$

a stable chaotic synchronization may be achieved between the continuous chaotic systems 12 and 22 without transmission of the synchronizing impulse.

(2) The disturbance coupling modules 16 and 26 disturbs the respective local digital chaotic systems 11 and 21 every time after $\Delta_3'$ times of iterations are completed in the digital chaotic systems 11 and 21. The sampling clock period $\Delta_2$ and the times of iterations $\Delta_3'$ should meet the following relation:

$$\Delta_2 = \Delta_3' \cdot T_2 \quad (6b)$$

(3) If the digital chaotic system is a difference equation of a continuous chaotic system with finite word length, which is identical to the equation (2), the digital chaotic system may be expressed as equation (7)

$$X_j(i+1) = (I + \tau \cdot A) \cdot X_j(i) + \tau \cdot \Phi(X_j(i)) \quad (7)$$

where, $\tau$ is a positive real number.

$\lambda_1$ is assumed to be the largest Eigenvalue of $(I+\tau\cdot A)^T (I+\tau\cdot A)$.

The duration $\Delta_1$ for which the synchronization coupling modules 15 and 25 output the synchronizing impulse signals should further satisfy the equation (8a), in addition to satisfying equation (5).

$$\Delta_1 > -\tau \cdot \left\lfloor \frac{\ln d}{2\ln(\sqrt{\lambda_1} + \tau L)} \right\rfloor; \quad (8a)$$

and $\Delta_4'$ should meet equation (8b), in addition to satisfying equation (6a).

$$\Delta_4' > -\left\lfloor \frac{\ln d}{2\ln(\sqrt{\lambda_1} + \tau L)} \right\rfloor \quad (8b)$$

At this time, a chaotic synchronization may be achieved between the continuous chaotic systems 12 and 22. On the other hand, the errors between the digital chaotic system and local continuous chaotic system may not approach to zero, that is, the continuous chaotic system and the local digital chaotic system may not be completely synchronized, so that the continuous chaotic system may provide a disturbance to overcome the characteristic degradation.

It should be noted that all the time in the above criterions is present by taking the running time of the continuous chaotic system as a reference time.

Embodiment 1

In this embodiment, the analog-digital mixed chaotic system is designed by using the Lorenz chaotic system. The operation precision of the digital chaotic system is 19 bits, which 7 bits are adapted to indicate the integer component of a variable in the digital chaotic system, 11 bits are adapted to indicate the decimal component of the variable in the digital chaotic system, and the remaining 1 bit is adapted to indicate the sign of the variable in the digital chaotic system.

It is assumed that the digital Lorenz chaotic systems 11 and 21 are $$\begin{cases} x_j(i+1) = (1-\tau\cdot\sigma)\cdot x_j(i) + \tau\cdot\sigma\cdot y_j(i) + \eta_1\cdot h(i,\tilde{x}_j(t)) \\ y_j(i+1) = \tau\cdot r\cdot x_j(i) + (1-\tau)\cdot y_j(i) - \\ \quad \tau\cdot x_j(i)\cdot z_j(i) + \eta_2\cdot h(i,\tilde{y}_j(t)) \quad i = 0, 1, 2, \ldots \\ z_j(i+1) = (1-\tau\cdot\beta)\cdot z_j(i) + \tau\cdot x_j(i)\cdot y_j(i) + \eta_3\cdot h(i,\tilde{z}_j(t)) \end{cases} \quad (9)$$

where, j=1,2 denotes the digital chaotic systems 11 and 21, respectively, the parameters are $\sigma$=10, r=28, $\beta$=2.5, $\tau$=5×10$^{-4}$ s;

h(i,•) is the disturbance coupling function, and $$h(i,x) = \begin{cases} 0 & i \bmod \Delta_3' \neq 0 \text{ or } i < K \\ D(x) & i \bmod \Delta_3' = 0 \text{ and } i \geq K \end{cases} \quad (10)$$

where D(●) is an A/D conversion function, and In this embodiment, the output of the continuous chaotic system is converted into a digital value of 19 bits, the disturbance coupling intensities are $\eta_1$=0.5, $\eta_2$=0.5, $\eta_3$=0.5.

It is assumed that the continuous Lorenz chaotic systems 12 and 22 are $$\begin{cases} \frac{d}{dt}\tilde{x}_j(t) = -\sigma\cdot\tilde{x}_j(t) + \sigma\cdot\tilde{y}_j(t) \\ \frac{d}{dt}\tilde{y}_j(t) = r\cdot\tilde{x}_j(t) - \tilde{y}_j(t) - \tilde{x}_j(t)\cdot\tilde{z}_j(t) \\ \frac{d}{dt}\tilde{z}_j(t) = -\beta\cdot\tilde{z}_j(t) + \tilde{x}_j(t)\cdot\tilde{y}_j(t) \\ \Delta\tilde{x}_j = b_1\cdot(\tilde{x}_j(t) - w(x_j(n_k))) \\ \Delta\tilde{y}_j = b_2\cdot(\tilde{y}_j(t) - w(y_j(n_k))) \\ \Delta\tilde{z}_j = b_3\cdot(\tilde{z}_j(t) - w(z_j(n_k))) \end{cases} \quad (11)$$

where, j=1,2 denotes the continuous Lorenz chaotic systems 12 and 22, respectively;

the parameters are $\sigma$=10, r=28, $\beta$=2.66, $b_1$=−0.2, $b_2$=−0.6, $b_3$=−0.6;

Lipschiz index L of the continuous Lorenz chaotic system is about 50.

The workflow of the analog-digital mixed chaotic cipher system is shown as follows.

(1) Two communication parties appoint the following parameters according to equation (9) for the digital chaotic system, equation (11) for the continuous chaotic system and equations (5), (6a), (6b), (8a) and (8b) for the synchronization conditions:

the time $T_2$=0.35 ms for the digital chaotic systems 11 and 21 to execute one iteration;

the period $\Delta_4'$=10 for the digital chaotic systems 11 and 21 to output signals to the individual synchronization coupling modules 15 and 25;

the duration $\Delta_1$=3.5 ms for which the synchronization coupling modules 15 and 25 output synchronization impulses;

the period $\Delta_3'$=1000 for the disturbance coupling modules 16 and 26 to output disturbance signals to the individual digital chaotic systems 11 and 21;

the predetermined constant K=1000 for the disturbance coupling modules, and the period $\Delta_2$=0.35 s for the disturbance coupling modules 16 and 26 to sample the respective continuous chaotic systems 12 and 22.

(2) The two communication parties further appoint that:
the initial conditions of the digital chaotic systems 11 and 21 are $x_1(0)=x_2(0)=0.454$, $y_1(0)=y_2(0)=0.5236$, $z_1(0)=z_2(0)=0.55878$;
the times of iterations when the digital chaotic systems output the encryption/decryption key is $\Delta_1'=1$, and
the output signal selected by the multiplexing switch is the digital chaotic sequence generated by the digital chaotic systems 11 and 21.

(3) The digital chaotic systems 11 and 21 are initialized by using the appointed initial conditions, and the initial states of the continuous chaotic systems 12 and 22 are randomly generated.

Figure 7:
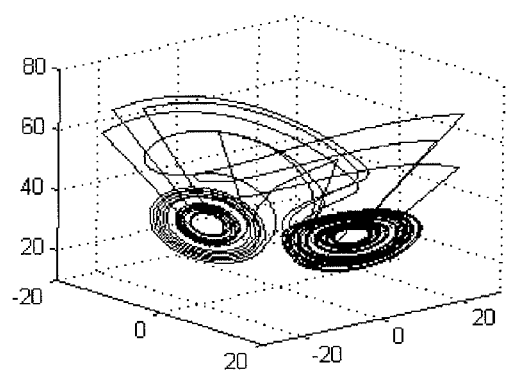
FIG. 7 is a phase diagram of the digital chaotic system 1.
Figure 8:
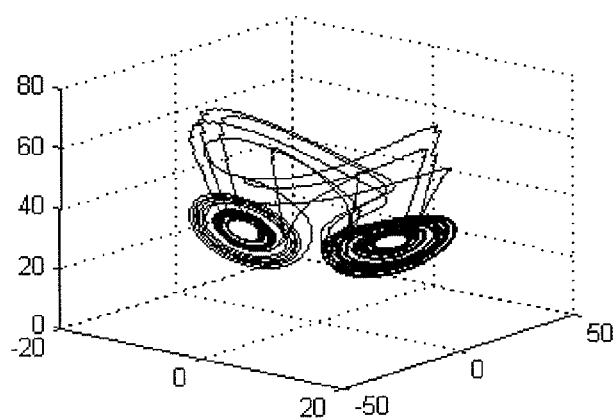
FIG. 8 is a phase diagram of the continuous chaotic system 1.

(4) Under control of the controlling modules 14 and 24, the synchronization coupling modules 15 and 25 output the synchronizing impulse signals for applying to the respective local continuous chaotic systems 12 and 22. FIG. 7 is a phase diagram of the digital chaotic system 11, FIG. 8 is a phase diagram of the continuous Lorenz chaotic system 12, and both of them illustrate that the attractors of the analog-digital mixed chaotic system still have the same level complexity as those of the Lorenz chaotic system. FIG. 9 shows the errors between the state variables of the continuous Lorenz chaotic systems 12 and 22, where $e_x(t)=\tilde{x}_1(t)-\tilde{x}_2(t)$, $e_y(t)=\tilde{y}_1(t)-\tilde{y}_2(t)$, and $e_z(t)=\tilde{z}_1(t)-\tilde{z}_2(t)$. It can be seen from FIG. 9 that errors between the state variables of the two continuous chaotic systems converge to zero, that is, the continuous chaotic system 1 and the continuous chaotic system 2 are synchronized.

(5) The disturbance coupling modules 16 and 26 sample, quantize and convert the respective local continuous chaotic systems 12 and 22 under control of the controlling modules 14 and 24, and obtain the disturbance signal for disturbing the digital chaotic systems.

(6) After the digital chaotic system has completed 1000 times of initial iterations, the analog-digital mixed chaotic system begins to output a key. A digital chaotic sequence generated by the digital chaotic systems 11 and 21 is first amplitude converted in the encoding modules 19 and 29 to get $v_j(2 \cdot i)=500 \cdot (x_j(i+1000)+25)$, $v_j(2 \cdot i+1)=500 \cdot (y_j(i+1000)+35)$, $i=0, 1, 2, \ldots$, $j=1,2$. The amplitude converted sequence is encoded with an encoding function of $S(v)=v \bmod 256$. Finally, a key stream of the analog-digital mixed systems 1, 2 is obtained after a nonlinear conversion on the encoded sequence. In this embodiment, the encoded sequences $v_1(i)$ and $v_2(i)$ ($i=0, 1, 2, \ldots$) are converted with the nonlinear conversion $F(\bullet)$ (shown as Table 1), and key sequences $k_1(i)$ and $k_2(i)$ ($i=0, 1, 2, \ldots$) are obtained. FIG. 10 is the statistical distribution diagram for the 2,000,000 keys $k_1(i)$ ($i=0, 1, 2, \ldots, 2,000,000$) generated by the analog-digital mixed chaotic system 1. As shown in FIG. 10, it is illustrated that the distribution of the key sequences generated by an analog-digital mixed chaotic system is relatively uniform. At last, a cipher text (or a plaintext) can be obtained by XOR of the key and a plaintext (or a cipher text).

TABLE 1

| Nonlinear conversion $F(\cdot)$ | | | | | | | | | | | | | | | | |
|---|---|---|---|---|---|---|---|---|---|---|---|---|---|---|---|---|
| v | 0 | 1 | 2 | 3 | 4 | 5 | 6 | 7 | 8 | 9 | 10 | 11 | 12 | 13 | 14 | 15 |
| F(v) | 169 | 133 | 214 | 211 | 84 | 29 | 172 | 37 | 93 | 67 | 24 | 30 | 81 | 252 | 202 | 99 |
| v | 16 | 17 | 18 | 19 | 20 | 21 | 22 | 23 | 24 | 25 | 26 | 27 | 28 | 29 | 30 | 31 |
| F(v) | 40 | 68 | 32 | 157 | 224 | 226 | 200 | 23 | 165 | 143 | 3 | 123 | 187 | 19 | 210 | 238 |
| v | 32 | 33 | 34 | 35 | 36 | 37 | 38 | 39 | 40 | 41 | 42 | 43 | 44 | 45 | 46 | 47 |
| F(v) | 112 | 140 | 63 | 168 | 50 | 221 | 246 | 116 | 236 | 149 | 11 | 87 | 92 | 91 | 189 | 1 |
| v | 48 | 49 | 50 | 51 | 52 | 53 | 54 | 55 | 56 | 57 | 58 | 59 | 60 | 61 | 62 | 63 |
| F(v) | 36 | 28 | 115 | 152 | 16 | 204 | 242 | 217 | 44 | 231 | 114 | 131 | 155 | 209 | 134 | 201 |
| v | 64 | 65 | 66 | 67 | 68 | 69 | 70 | 71 | 72 | 73 | 74 | 75 | 76 | 77 | 78 | 79 |
| F(v) | 96 | 80 | 163 | 235 | 215 | 182 | 158 | 79 | 183 | 90 | 198 | 120 | 166 | 18 | 175 | 213 |
| v | 80 | 81 | 82 | 83 | 84 | 85 | 86 | 87 | 88 | 89 | 90 | 91 | 92 | 93 | 94 | 95 |
| F(v) | 97 | 195 | 180 | 65 | 82 | 125 | 141 | 8 | 31 | 153 | 0 | 25 | 4 | 83 | 247 | 225 |
| v | 96 | 97 | 98 | 99 | 100 | 101 | 102 | 103 | 104 | 105 | 106 | 107 | 108 | 109 | 110 | 111 |
| F(v) | 253 | 118 | 47 | 39 | 176 | 139 | 14 | 171 | 162 | 110 | 147 | 77 | 105 | 124 | 9 | 10 |
| v | 112 | 113 | 114 | 115 | 116 | 117 | 118 | 119 | 120 | 121 | 122 | 123 | 124 | 125 | 126 | 127 |
| F(v) | 191 | 239 | 243 | 197 | 135 | 20 | 254 | 100 | 222 | 46 | 75 | 26 | 6 | 33 | 107 | 102 |
| v | 128 | 129 | 130 | 131 | 132 | 133 | 134 | 135 | 136 | 137 | 138 | 139 | 140 | 141 | 142 | 143 |
| F(v) | 2 | 245 | 146 | 138 | 12 | 179 | 126 | 208 | 122 | 71 | 150 | 229 | 38 | 128 | 173 | 223 |
| v | 144 | 145 | 146 | 147 | 148 | 149 | 150 | 151 | 152 | 153 | 154 | 155 | 156 | 157 | 158 | 159 |
| F(v) | 161 | 48 | 55 | 174 | 54 | 21 | 34 | 56 | 244 | 167 | 69 | 76 | 129 | 233 | 132 | 151 |
| v | 160 | 161 | 162 | 163 | 164 | 165 | 166 | 167 | 168 | 169 | 170 | 171 | 172 | 173 | 174 | 175 |
| F(v) | 53 | 203 | 206 | 60 | 113 | 17 | 199 | 137 | 117 | 251 | 218 | 248 | 148 | 89 | 130 | 196 |
| v | 176 | 177 | 178 | 179 | 180 | 181 | 182 | 183 | 184 | 185 | 186 | 187 | 188 | 189 | 190 | 191 |
| F(v) | 255 | 73 | 57 | 103 | 192 | 207 | 13 | 184 | 15 | 142 | 66 | 35 | 145 | 108 | 219 | 164 |
| v | 192 | 193 | 194 | 195 | 196 | 197 | 198 | 199 | 200 | 201 | 202 | 203 | 204 | 205 | 206 | 207 |
| F(v) | 52 | 241 | 72 | 194 | 111 | 61 | 45 | 64 | 190 | 62 | 188 | 193 | 170 | 186 | 78 | 85 |
| v | 208 | 209 | 210 | 211 | 212 | 213 | 214 | 215 | 216 | 217 | 218 | 219 | 220 | 221 | 222 | 223 |
| F(v) | 59 | 220 | 104 | 127 | 156 | 216 | 74 | 86 | 119 | 160 | 237 | 70 | 181 | 43 | 101 | 250 |
| v | 224 | 225 | 226 | 227 | 228 | 229 | 230 | 231 | 232 | 233 | 234 | 235 | 236 | 237 | 238 | 239 |
| F(v) | 227 | 185 | 177 | 159 | 94 | 249 | 230 | 178 | 49 | 234 | 109 | 95 | 228 | 240 | 205 | 136 |
| v | 240 | 241 | 242 | 243 | 244 | 245 | 246 | 247 | 248 | 249 | 250 | 251 | 252 | 253 | 254 | 255 |
| F(v) | 22 | 58 | 88 | 212 | 98 | 41 | 7 | 51 | 232 | 27 | 5 | 121 | 144 | 106 | 42 | 154 |

Embodiment 2

In this embodiment, the analog-digital mixed chaotic system is designed by using the Chen chaotic system. The operation precision of the digital chaotic system is 19 bits, which 7 bits are adapted to indicate the integer component of a variable in the digital chaotic system, 11 bits are adapted to indicate the decimal component of the variable in the digital chaotic system, and the remaining 1 bit is adapted to indicate the sign of the variable value in the digital chaotic system.

It is assumed that the digital Chen chaotic systems 11 and 21 are $$\begin{cases} x_j(i+1) = (1-\tau \cdot a) \cdot x_j(i) + \tau \cdot a \cdot y_j(i) + \eta_1 \cdot h(i, \tilde{x}_j(t)) \\ y_j(i+1) = \tau \cdot (c-a) \cdot x_j(i) + (1+\tau \cdot c) \cdot y_j(i) - \\ \tau \cdot x_j(i) \cdot z_j(i) + \eta_2 \cdot h(i, \tilde{y}_j(t)) \quad i = 0, 1, 2, \ldots \\ z_j(i+1) = (1-\tau \cdot b) \cdot z_j(i) + \tau \cdot x_j(i) \cdot y_j(i) + \eta_3 \cdot h(i, \tilde{z}_j(t)) \end{cases} \quad (12)$$

where, j=1,2 denotes the digital chaotic systems 11 and 21, respectively;

the parameters are a=35, b=3, c=28, $\tau=5\times10^{-4}$ S;

h(i,•) is a disturbance coupling function, and $$h(i, x) = \begin{cases} 0 & i \bmod \Delta'_3 \neq 0 \text{ or } i < K \\ D(x) & i \bmod \Delta'_3 = 0 \text{ and } i \geq K \end{cases} \quad (13)$$

where D(●) is an A/D conversion function, and In this embodiment, the output of the continuous chaotic system is converted into a digital amount of 19 bits;

the disturbance coupling intensities are $\eta_1=0.01$, $\eta_2=0.01$, $\eta_3=0.01$.

It is assumed that the continuous Chen chaotic systems 12 and 22 are $$\begin{cases} \frac{d}{dt}\tilde{x}_j(t) = -a \cdot \tilde{x}_j(t) + a \cdot \tilde{y}_j(t) \\ \frac{d}{dt}\tilde{y}_j(t) = (c-a) \cdot \tilde{x}_j(t) + c \cdot \tilde{y}_j(t) - \tilde{x}_j(t) \cdot \tilde{z}_j(t) \\ \frac{d}{dt}\tilde{z}_j(t) = -b \cdot \tilde{z}_j(t) + \tilde{x}_j(t) \cdot \tilde{y}_j(t) \\ \Delta \tilde{x}_j = b_1 \cdot (\tilde{x}_j(t) - w(x_j(n_k))) \\ \Delta \tilde{y}_j = b_2 \cdot (\tilde{y}_j(t) - w(y_j(n_k))) \\ \Delta \tilde{z}_j = b_3 \cdot (\tilde{z}_j(t) - w(z_j(n_k))) \end{cases} \quad (14)$$

where, j=1,2 denotes the continuous Chen chaotic systems 12 and 22 respectively, the parameters are a=35, b=3, c=28, $b_1=-0.8$, $b_2=-0.8$, $b_3=-0.8$;

Lipschiz index L of the Chen system is about 85.

The workflow of the analog-digital mixed chaotic cipher system is as follows.

(1) Two communication parties appoint the following parameters according to equation (9) for the digital chaotic system, equation (11) for the continuous chaotic system and equations (5), (6a), (6b), (8a) and (8b) for the synchronization conditions:

the time $T_2=0.33$ ms for the digital chaotic systems 11 and 21 to execute one iteration;

the period $\Delta_4'=30$ for the digital chaotic systems 11 and 21 to output signals to the respective synchronization coupling modules 15 and 25;

the duration $\Delta_1=10$ ms of the synchronization coupling modules 15 and 25 outputting synchronization impulses;

the period $\Delta_3'=1000$ for the disturbance coupling modules 16 and 26 to output disturbance signals to the respective digital chaotic systems 11 and 21;

the predetermined constant K=3000 for the disturbance coupling modules, and the period $\Delta_2=0.33$ s for the disturbance coupling modules 16 and 26 to sample the respective continuous chaotic systems 12 and 22.

(2) The two communication parties appoint further that:

the initial conditions of the digital chaotic systems 11 and 21 are $x_1(0)=x_2(0)=0.454$, $y_1(0)=y_2(0)=0.5236$, $z_1(0)=z_2(0)=0.55878$, the times of iterations when the digital chaotic systems to output the encryption/decryption key is $\Delta_s'=1$, and the output signal selected by the multiplexing switch is the digital chaotic sequence generated by the digital chaotic systems 11 and 21.

(3) The two communication parties initiate the digital chaotic systems 11 and 21 by using the appointed initial conditions, and randomly generate the initial states of the continuous chaotic systems 12 and 22.

(4) Under control of the controlling modules 14 and 24, the synchronization coupling modules 15 and 25 output the synchronizing impulse signals to be applied to the respective local continuous chaotic systems 12 and 22.

(5) Also under control of the controlling modules 14 and 24, the disturbance coupling modules 16 and 26 sample, quantize and convert the respective local continuous chaotic systems 12 and 22, and obtain the disturbance signal for disturbing the digital chaotic systems.

(6) The digital chaotic sequence generated by the digital chaotic systems 11 and 21 is amplitude converted in the encoding modules 19 and 29 to get vj(3·i)=1000 (xj(i+3000)+30), vj(3·i+1)=1000·(yj(i+3000)+40), vj(3·i+2)=500·zj(i+3000), i=0, 1, 2, . . . , j=1,2. The amplitude converted sequence is encoded with the encoding function of S(v)=v mod 256. Finally, a key stream generated by the analog-digital mixed systems 1, 2 is obtained after a nonlinear conversion on the encoded sequence. In this embodiment, the chaotic sequences generated by the analog-digital mixed chaotic system are converted with three nonlinear conversions F(•)(j=0,1,2) (shown as Table 2(a), 2(b) and 2(c)), and the conversion rule is to convert the encoded sequences $v_1(i)$ and $v_2(i)$(i=0, 1, 2, . . . ) with the nonlinear conversion $F_{i \bmod 3}$(•) so as to get the key sequences of $k_1(i)$ and $k_2(i)$(i=0, 1, 2, . . . ). At last, a cipher text (or a plaintext) can be obtained by XOR of the key and a plaintext (or a cipher text).

TABLE 2(a)

| Nonlinear conversion $F_0$(·) | | | | | | | | | | | | | | | |
|---|---|---|---|---|---|---|---|---|---|---|---|---|---|---|---|
| v | 0 | 1 | 2 | 3 | 4 | 5 | 6 | 7 | 8 | 9 | 10 | 11 | 12 | 13 | 14 | 15 |
| F(v) | 169 | 133 | 214 | 211 | 84 | 29 | 172 | 37 | 93 | 67 | 24 | 30 | 81 | 252 | 202 | 99 |
| v | 16 | 17 | 18 | 19 | 20 | 21 | 22 | 23 | 24 | 25 | 26 | 27 | 28 | 29 | 30 | 31 |
| F(v) | 40 | 68 | 32 | 157 | 224 | 226 | 200 | 23 | 165 | 143 | 3 | 123 | 187 | 19 | 210 | 238 |
| v | 32 | 33 | 34 | 35 | 36 | 37 | 38 | 39 | 40 | 41 | 42 | 43 | 44 | 45 | 46 | 47 |
| F(v) | 112 | 140 | 63 | 168 | 50 | 221 | 246 | 116 | 236 | 149 | 11 | 87 | 92 | 91 | 189 | 1 |
| v | 48 | 49 | 50 | 51 | 52 | 53 | 54 | 55 | 56 | 57 | 58 | 59 | 60 | 61 | 62 | 63 |
| F(v) | 36 | 28 | 115 | 152 | 16 | 204 | 242 | 217 | 44 | 231 | 114 | 131 | 155 | 209 | 134 | 201 |

TABLE 2(a)-continued

Nonlinear conversion $F_0(\cdot)$

| v | 64 | 65 | 66 | 67 | 68 | 69 | 70 | 71 | 72 | 73 | 74 | 75 | 76 | 77 | 78 | 79 |
|---|---|---|---|---|---|---|---|---|---|---|---|---|---|---|---|---|
| F(v) | 96 | 80 | 163 | 235 | 215 | 182 | 158 | 79 | 183 | 90 | 198 | 120 | 166 | 18 | 175 | 213 |
| v | 80 | 81 | 82 | 83 | 84 | 85 | 86 | 87 | 88 | 89 | 90 | 91 | 92 | 93 | 94 | 95 |
| F(v) | 97 | 195 | 180 | 65 | 82 | 125 | 141 | 8 | 31 | 153 | 0 | 25 | 4 | 83 | 247 | 225 |
| v | 96 | 97 | 98 | 99 | 100 | 101 | 102 | 103 | 104 | 105 | 106 | 107 | 108 | 109 | 110 | 111 |
| F(v) | 253 | 118 | 47 | 39 | 176 | 139 | 14 | 171 | 162 | 110 | 147 | 77 | 105 | 124 | 9 | 10 |
| v | 112 | 113 | 114 | 115 | 116 | 117 | 118 | 119 | 120 | 121 | 122 | 123 | 124 | 125 | 126 | 127 |
| F(v) | 191 | 239 | 243 | 197 | 135 | 20 | 254 | 100 | 222 | 46 | 75 | 26 | 6 | 33 | 107 | 102 |
| v | 128 | 129 | 130 | 131 | 132 | 133 | 134 | 135 | 136 | 137 | 138 | 139 | 140 | 141 | 142 | 143 |
| F(v) | 2 | 245 | 146 | 138 | 12 | 179 | 126 | 208 | 122 | 71 | 150 | 229 | 38 | 128 | 173 | 223 |
| v | 144 | 145 | 146 | 147 | 148 | 149 | 150 | 151 | 152 | 153 | 154 | 155 | 156 | 157 | 158 | 159 |
| F(v) | 161 | 48 | 55 | 174 | 54 | 21 | 34 | 56 | 244 | 167 | 69 | 76 | 129 | 233 | 132 | 151 |
| v | 160 | 161 | 162 | 163 | 164 | 165 | 166 | 167 | 168 | 169 | 170 | 171 | 172 | 173 | 174 | 175 |
| F(v) | 53 | 203 | 206 | 60 | 113 | 17 | 199 | 137 | 117 | 251 | 218 | 248 | 148 | 89 | 130 | 196 |
| v | 176 | 177 | 178 | 179 | 180 | 181 | 182 | 183 | 184 | 185 | 186 | 187 | 188 | 189 | 190 | 191 |
| F(v) | 255 | 73 | 57 | 103 | 192 | 207 | 13 | 184 | 15 | 142 | 66 | 35 | 145 | 108 | 219 | 164 |
| v | 192 | 193 | 194 | 195 | 196 | 197 | 198 | 199 | 200 | 201 | 202 | 203 | 204 | 205 | 206 | 207 |
| F(v) | 52 | 241 | 72 | 194 | 111 | 61 | 45 | 64 | 190 | 62 | 188 | 193 | 170 | 186 | 78 | 85 |
| v | 208 | 209 | 210 | 211 | 212 | 213 | 214 | 215 | 216 | 217 | 218 | 219 | 220 | 221 | 222 | 223 |
| F(v) | 59 | 220 | 104 | 127 | 156 | 216 | 74 | 86 | 119 | 160 | 237 | 70 | 181 | 43 | 101 | 250 |
| v | 224 | 225 | 226 | 227 | 228 | 229 | 230 | 231 | 232 | 233 | 234 | 235 | 236 | 237 | 238 | 239 |
| F(v) | 227 | 185 | 177 | 159 | 94 | 249 | 230 | 178 | 49 | 234 | 109 | 95 | 228 | 240 | 205 | 136 |
| v | 240 | 241 | 242 | 243 | 244 | 245 | 246 | 247 | 248 | 249 | 250 | 251 | 252 | 253 | 254 | 255 |
| F(v) | 22 | 58 | 88 | 212 | 98 | 41 | 7 | 51 | 232 | 27 | 5 | 121 | 144 | 106 | 42 | 154 |

TABLE 2(b)

Nonlinear conversion $F_1(\cdot)$

| v | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| F(v) | 56 | 232 | 45 | 166 | 207 | 222 | 179 | 184 | 175 | 96 | 85 | 199 | 68 | 111 | 107 | 91 |
| v | 16 | 17 | 18 | 19 | 20 | 21 | 22 | 23 | 24 | 25 | 26 | 27 | 28 | 29 | 30 | 31 |
| F(v) | 195 | 98 | 51 | 181 | 41 | 160 | 226 | 167 | 211 | 145 | 17 | 6 | 28 | 188 | 54 | 75 |
| v | 32 | 33 | 34 | 35 | 36 | 37 | 38 | 39 | 40 | 41 | 42 | 43 | 44 | 45 | 46 | 47 |
| F(v) | 239 | 136 | 108 | 168 | 23 | 196 | 22 | 244 | 194 | 69 | 225 | 214 | 63 | 61 | 142 | 152 |
| v | 48 | 49 | 50 | 51 | 52 | 53 | 54 | 55 | 56 | 57 | 58 | 59 | 60 | 61 | 62 | 63 |
| F(v) | 40 | 78 | 246 | 62 | 165 | 249 | 13 | 223 | 216 | 43 | 102 | 122 | 39 | 47 | 241 | 114 |
| v | 64 | 65 | 66 | 67 | 68 | 69 | 70 | 71 | 72 | 73 | 74 | 75 | 76 | 77 | 78 | 79 |
| F(v) | 66 | 212 | 65 | 192 | 115 | 103 | 172 | 139 | 247 | 173 | 128 | 31 | 202 | 44 | 170 | 52 |
| v | 80 | 81 | 82 | 83 | 84 | 85 | 86 | 87 | 88 | 89 | 90 | 91 | 92 | 93 | 94 | 95 |
| F(v) | 210 | 11 | 238 | 233 | 93 | 148 | 24 | 248 | 87 | 174 | 8 | 197 | 19 | 205 | 134 | 185 |
| v | 96 | 97 | 98 | 99 | 100 | 101 | 102 | 103 | 104 | 105 | 106 | 107 | 108 | 109 | 110 | 111 |
| F(v) | 255 | 125 | 193 | 49 | 245 | 138 | 106 | 177 | 209 | 32 | 215 | 2 | 34 | 4 | 104 | 113 |
| v | 112 | 113 | 114 | 115 | 116 | 117 | 118 | 119 | 120 | 121 | 122 | 123 | 124 | 125 | 126 | 127 |
| F(v) | 7 | 219 | 157 | 153 | 97 | 190 | 230 | 89 | 221 | 81 | 144 | 220 | 154 | 163 | 171 | 208 |
| v | 128 | 129 | 130 | 131 | 132 | 133 | 134 | 135 | 136 | 137 | 138 | 139 | 140 | 141 | 142 | 143 |
| F(v) | 129 | 15 | 71 | 26 | 227 | 236 | 141 | 191 | 150 | 123 | 92 | 162 | 161 | 99 | 35 | 77 |
| v | 144 | 145 | 146 | 147 | 148 | 149 | 150 | 151 | 152 | 153 | 154 | 155 | 156 | 157 | 158 | 159 |
| F(v) | 200 | 158 | 156 | 58 | 12 | 46 | 186 | 110 | 159 | 90 | 242 | 146 | 243 | 73 | 120 | 204 |
| v | 160 | 161 | 162 | 163 | 164 | 165 | 166 | 167 | 168 | 169 | 170 | 171 | 172 | 173 | 174 | 175 |
| F(v) | 21 | 251 | 112 | 117 | 127 | 53 | 16 | 3 | 100 | 109 | 198 | 116 | 213 | 180 | 234 | 9 |
| v | 176 | 177 | 178 | 179 | 180 | 181 | 182 | 183 | 184 | 185 | 186 | 187 | 188 | 189 | 190 | 191 |
| F(v) | 118 | 25 | 254 | 64 | 18 | 224 | 189 | 5 | 250 | 1 | 240 | 42 | 94 | 169 | 86 | 67 |
| v | 192 | 193 | 194 | 195 | 196 | 197 | 198 | 199 | 200 | 201 | 202 | 203 | 204 | 205 | 206 | 207 |
| F(v) | 133 | 20 | 137 | 155 | 176 | 229 | 72 | 121 | 151 | 252 | 30 | 130 | 33 | 140 | 27 | 95 |
| v | 208 | 209 | 210 | 211 | 212 | 213 | 214 | 215 | 216 | 217 | 218 | 219 | 220 | 221 | 222 | 223 |
| F(v) | 119 | 84 | 178 | 29 | 37 | 79 | 0 | 70 | 237 | 88 | 82 | 235 | 126 | 218 | 201 | 253 |
| v | 224 | 225 | 226 | 227 | 228 | 229 | 230 | 231 | 232 | 233 | 234 | 235 | 236 | 237 | 238 | 239 |
| F(v) | 48 | 149 | 101 | 60 | 182 | 228 | 187 | 124 | 14 | 80 | 57 | 38 | 50 | 132 | 105 | 147 |
| v | 240 | 241 | 242 | 243 | 244 | 245 | 246 | 247 | 248 | 249 | 250 | 251 | 252 | 253 | 254 | 255 |
| F(v) | 55 | 231 | 36 | 164 | 203 | 83 | 10 | 135 | 217 | 76 | 131 | 143 | 206 | 59 | 74 | 183 |

TABLE 2(c)

Nonlinear conversion $F_2(\cdot)$

| v | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| F(v) | 99 | 124 | 119 | 123 | 242 | 107 | 111 | 197 | 48 | 1 | 103 | 43 | 254 | 215 | 171 | 118 |
| v | 16 | 17 | 18 | 19 | 20 | 21 | 22 | 23 | 24 | 25 | 26 | 27 | 28 | 29 | 30 | 31 |
| F(v) | 202 | 130 | 201 | 125 | 250 | 89 | 71 | 240 | 173 | 212 | 162 | 175 | 156 | 164 | 114 | 192 |
| v | 32 | 33 | 34 | 35 | 36 | 37 | 38 | 39 | 40 | 41 | 42 | 43 | 44 | 45 | 46 | 47 |
| F(v) | 183 | 253 | 147 | 38 | 54 | 63 | 247 | 204 | 52 | 165 | 229 | 241 | 113 | 216 | 49 | 21 |
| v | 48 | 49 | 50 | 51 | 52 | 53 | 54 | 55 | 56 | 57 | 58 | 59 | 60 | 61 | 62 | 63 |

TABLE 2(c)-continued

Nonlinear conversion $F_2(\cdot)$

| F(v) | 4 | 199 | 35 | 195 | 24 | 150 | 5 | 154 | 7 | 18 | 128 | 226 | 235 | 39 | 178 | 117 |
|---|---|---|---|---|---|---|---|---|---|---|---|---|---|---|---|---|
| v | 64 | 65 | 66 | 67 | 68 | 69 | 70 | 71 | 72 | 73 | 74 | 75 | 76 | 77 | 78 | 79 |
| F(v) | 9 | 131 | 44 | 26 | 27 | 110 | 90 | 160 | 82 | 59 | 214 | 179 | 41 | 227 | 47 | 132 |
| v | 80 | 81 | 82 | 83 | 84 | 85 | 86 | 87 | 88 | 89 | 90 | 91 | 92 | 93 | 94 | 95 |
| F(v) | 83 | 209 | 0 | 237 | 32 | 252 | 177 | 91 | 106 | 203 | 190 | 57 | 74 | 76 | 88 | 207 |
| v | 96 | 97 | 98 | 99 | 100 | 101 | 102 | 103 | 104 | 105 | 106 | 107 | 108 | 109 | 110 | 111 |
| F(v) | 208 | 239 | 170 | 251 | 67 | 77 | 51 | 133 | 69 | 249 | 2 | 127 | 80 | 60 | 159 | 168 |
| v | 112 | 113 | 114 | 115 | 116 | 117 | 118 | 119 | 120 | 121 | 122 | 123 | 124 | 125 | 126 | 127 |
| F(v) | 81 | 163 | 64 | 143 | 146 | 157 | 56 | 245 | 188 | 182 | 218 | 33 | 16 | 255 | 243 | 210 |
| v | 128 | 129 | 130 | 131 | 132 | 133 | 134 | 135 | 136 | 137 | 138 | 139 | 140 | 141 | 142 | 143 |
| F(v) | 205 | 12 | 19 | 236 | 95 | 151 | 68 | 23 | 196 | 167 | 126 | 61 | 100 | 93 | 25 | 115 |
| v | 144 | 145 | 146 | 147 | 148 | 149 | 150 | 151 | 152 | 153 | 154 | 155 | 156 | 157 | 158 | 159 |
| F(v) | 96 | 129 | 79 | 220 | 34 | 42 | 144 | 136 | 70 | 238 | 184 | 20 | 222 | 94 | 11 | 219 |
| v | 160 | 161 | 162 | 163 | 164 | 165 | 166 | 167 | 168 | 169 | 170 | 171 | 172 | 173 | 174 | 175 |
| F(v) | 224 | 50 | 58 | 10 | 73 | 6 | 36 | 92 | 194 | 211 | 172 | 98 | 145 | 149 | 228 | 121 |
| v | 176 | 177 | 178 | 179 | 180 | 181 | 182 | 183 | 184 | 185 | 186 | 187 | 188 | 189 | 190 | 191 |
| F(v) | 231 | 200 | 55 | 109 | 141 | 213 | 78 | 169 | 108 | 86 | 244 | 234 | 101 | 122 | 174 | 8 |
| v | 192 | 193 | 194 | 195 | 196 | 197 | 198 | 199 | 200 | 201 | 202 | 203 | 204 | 205 | 206 | 207 |
| F(v) | 186 | 120 | 37 | 46 | 28 | 166 | 180 | 198 | 232 | 221 | 116 | 31 | 75 | 189 | 139 | 138 |
| v | 208 | 209 | 210 | 211 | 212 | 213 | 214 | 215 | 216 | 217 | 218 | 219 | 220 | 221 | 222 | 223 |
| F(v) | 112 | 62 | 181 | 102 | 72 | 3 | 246 | 14 | 97 | 53 | 87 | 185 | 134 | 193 | 29 | 158 |
| v | 224 | 225 | 226 | 227 | 228 | 229 | 230 | 231 | 232 | 233 | 234 | 235 | 236 | 237 | 238 | 239 |
| F(v) | 225 | 248 | 152 | 17 | 105 | 217 | 142 | 148 | 155 | 30 | 135 | 233 | 206 | 85 | 40 | 223 |
| v | 240 | 241 | 242 | 243 | 244 | 245 | 246 | 247 | 248 | 249 | 250 | 251 | 252 | 253 | 254 | 255 |
| F(v) | 140 | 161 | 137 | 13 | 191 | 230 | 66 | 104 | 65 | 153 | 45 | 15 | 176 | 84 | 187 | 22 |

Embodiment 3

In this embodiment, the analog-digital mixed chaotic system is designed by using a one-dimensional Logistic chaotic system and a Chen chaotic system as the digital chaotic system and the continuous chaotic system respectively. The operation precision of the digital chaotic system is 19 bits, which 18 bits are adapted to indicate the decimal component of a variable in the digital chaotic system, and the remaining 1 bit is adapted to indicate the sign of the variable in the digital chaotic system. Although the transmitting and receiving parties have appointed the time required for the digital chaotic systems 11 and 21 to perform one iteration, the actual time that the digital chaotic systems 11 and 21 take to execute each operation will be a bit different. Therefore, in this embodiment, the respective local digital chaotic system and continuous chaotic system are controlled by the controlling modules 14 and 24 in the analog-digital mixed chaotic systems 1 and 2, so that a stable synchronization between the continuous chaotic systems that are separated with each other in location can be achieved and thereby the characteristic degradation may be overcome in the digital chaotic system.

It is assumed that the digital Logistic chaotic systems 11 and 21 are $$x_j(i+1) = 4 \cdot x_j(i) \cdot (1 - x_j(i)) + \eta \cdot h(i, \tilde{x}_j(t)) \quad (15)$$

where, j=1,2 denotes the digital chaotic systems 11 and 21 respectively, h(i,·) is a disturbance coupling function, and $$h(i, x) = \begin{cases} 0 & i \bmod \Delta_3' \neq 0 \text{ or } i < K \\ D(x) & i \bmod \Delta_3' = 0 \text{ and } i \geq K \end{cases} \quad (16)$$

where D(●) is an analog to digital conversion function, and in this embodiment, the output of the continuous chaotic system is converted into a digital amount of 19 bits, and the disturbance coupling intensity is η=0.01.

It is assumed that the continuous Chen chaotic systems 12 and 22 are $$\begin{cases} \dfrac{d}{dt}\tilde{x}_j(t) = -a \cdot \tilde{x}_j(t) + a \cdot \tilde{y}_j(t) \\ \dfrac{d}{dt}\tilde{y}_j(t) = (c - a) \cdot \tilde{x}_j(t) + c \cdot \tilde{y}_j(t) - \tilde{x}_j(t) \cdot \tilde{z}_j(t) \\ \dfrac{d}{dt}\tilde{z}_j(t) = -b \cdot \tilde{z}_j(t) + \tilde{x}_j(t) \cdot \tilde{y}_j(t) \\ \Delta \tilde{y}_j = b_2 \cdot (\tilde{y}_j(t) - w(x_j(n_k))) \end{cases} \quad (17)$$

where, j=1,2 denotes the continuous Chen chaotic systems 12 and 22 respectively;

the parameters are a=35, b=3, c=28, $b_2$=−0.8;

Lipschiz index L of the Chen system is about 85.

The workflow of the analog-digital mixed chaotic cipher system is shown as follows.

(1) Two communication parties appoint the following parameters according to equation (9) for the digital chaotic system, equation (11) for the continuous chaotic system and equations (5), (6a), (6b), (8a) and (8b) for the synchronization conditions:

the time $T_2$=1 ms for the digital chaotic systems 11 and 21 to execute one iterative;

the period $\Delta_4'$=10 for the digital chaotic systems 11 and 21 to output signals to the respective synchronization coupling modules 15 and 25;

the duration $\Delta_1$=10 ms for which the synchronization coupling modules 15 and 25 output synchronizing impulses;

the period $\Delta_3'$=10 for the disturbance coupling modules 16 and 26 to output disturbance signals to the respective digital chaotic systems 11 and 21;

the predetermined constant K=5000 for the disturbance coupling modules; and the period $\Delta_2$=10 ms for the disturbance coupling modules 16 and 26 to sample the respective continuous Chen chaotic systems 12 and 22.

(2) The two communication parties further appoint that:

the initial conditions of the digital chaotic systems 11 and 21 are $x_1(0)=x_2(0)=0.333$;

the times of iterations when the digital chaotic systems to output the encryption/decryption key is $\Delta_5'=1$, and the output signal selected by the multiplexing switch is the digital chaotic sequence generated by the digital chaotic systems 11 and 21.

(3) The digital chaotic systems 11 and 21 are initialized by using the appointed initial conditions, and the initial states of the continuous chaotic systems 12 and 22 are randomly generated.

(4) Under control of the controlling modules 14 and 24, the synchronization coupling modules 15 and 25 output the synchronizing impulse signals to be applied to the respective local continuous chaotic systems 12 and 22.

(5) Under control of the controlling modules 14 and 24, the disturbance coupling modules 16 and 26 sample, quantize and convert the respective local continuous chaotic systems 12 and 22, and obtain the disturbance signal for disturbing the digital chaotic systems.

(6) After the digital chaotic system has completed 5000 times of initial iterations, the analog-digital mixed chaotic system begins to output a key. The digital chaotic sequence generated by the digital chaotic systems 11 and 21 is amplitude converted in the encoding modules 19 and 29 to get $v_j(i)=x_j(i+5000)(i=0, 1, 2, \ldots j=1,2)$. The amplitude converted sequence is encoded with the encoding function of $S(v)=[256(1-ar \cos v/\pi)]$, and finally a key stream of the analog-digital mixed systems 1, 2 is obtained after a nonlinear conversion. In this embodiment, the encoded sequences $v_1(i)$ and $v_2(i)(i=0, 1, 2, \ldots)$ are converted with the nonlinear conversion $F(\bullet)$ (shown as Table 3), and key sequences $k_1(i)$ and $k_2(i)(i=0, 1, 2, \ldots)$ are obtained. At last a cipher text (or a plaintext) can be obtained by XOR of the key and a plaintext (or a cipher text).

What is claimed is:

1. An analog-digital mixed chaotic system, comprising:
    a digital chaotic system adapted to generate a digital chaotic sequence;
    a continuous chaotic system adapted to generate a continuous chaotic signal;
    a synchronization coupling module adapted to generate a synchronizing impulse signal for controlling the continuous chaotic system according to states of the digital chaotic system and the continuous chaotic system, and output the synchronizing impulse signal to the continuous chaotic system;
    a disturbance coupling module adapted to disturb the digital chaotic system according to the state of the continuous chaotic system; and
    a controlling module adapted to control operating states of the digital chaotic system and the continuous chaotic system, and operating states of the synchronization coupling module and the disturbance coupling module.

2. The analog-digital mixed chaotic system according to claim 1, further comprising a timing and counting module adapted to record the operating states of the digital chaotic system and the continuous chaotic system, and output a corresponding signal to the controlling module according to the recoded result; and
    wherein the controlling module controls the operating states of the digital chaotic system, the continuous chaotic system, the synchronization coupling module and the disturbance coupling module according to the corresponding signal from the timing and counting module.

3. The analog-digital mixed chaotic system according to claim 2, wherein the timing and counting module comprises a first counter, a second counter and a third counter for count-

TABLE 3

| Nonlinear conversion $F(\cdot)$ | | | | | | | | | | | | | | | | |
|---|---|---|---|---|---|---|---|---|---|---|---|---|---|---|---|---|
| v | 0 | 1 | 2 | 3 | 4 | 5 | 6 | 7 | 8 | 9 | 10 | 11 | 12 | 13 | 14 | 15 |
| F(v) | 169 | 133 | 214 | 211 | 84 | 29 | 172 | 37 | 93 | 67 | 24 | 30 | 81 | 252 | 202 | 99 |
| v | 16 | 17 | 18 | 19 | 20 | 21 | 22 | 23 | 24 | 25 | 26 | 27 | 28 | 29 | 30 | 31 |
| F(v) | 40 | 68 | 32 | 157 | 224 | 226 | 200 | 23 | 165 | 143 | 3 | 123 | 187 | 19 | 210 | 238 |
| v | 32 | 33 | 34 | 35 | 36 | 37 | 38 | 39 | 40 | 41 | 42 | 43 | 44 | 45 | 46 | 47 |
| F(v) | 112 | 140 | 63 | 168 | 50 | 221 | 246 | 116 | 236 | 149 | 11 | 87 | 92 | 91 | 189 | 1 |
| v | 48 | 49 | 50 | 51 | 52 | 53 | 54 | 55 | 56 | 57 | 58 | 59 | 60 | 61 | 62 | 63 |
| F(v) | 36 | 28 | 115 | 152 | 16 | 204 | 242 | 217 | 44 | 231 | 114 | 131 | 155 | 209 | 134 | 201 |
| v | 64 | 65 | 66 | 67 | 68 | 69 | 70 | 71 | 72 | 73 | 74 | 75 | 76 | 77 | 78 | 79 |
| F(v) | 96 | 80 | 163 | 235 | 215 | 182 | 158 | 79 | 183 | 90 | 198 | 120 | 166 | 18 | 175 | 213 |
| v | 80 | 81 | 82 | 83 | 84 | 85 | 86 | 87 | 88 | 89 | 90 | 91 | 92 | 93 | 94 | 95 |
| F(v) | 97 | 195 | 180 | 65 | 82 | 125 | 141 | 8 | 31 | 153 | 0 | 25 | 4 | 83 | 247 | 225 |
| v | 96 | 97 | 98 | 99 | 100 | 101 | 102 | 103 | 104 | 105 | 106 | 107 | 108 | 109 | 110 | 111 |
| F(v) | 253 | 118 | 47 | 39 | 176 | 139 | 14 | 171 | 162 | 110 | 147 | 77 | 105 | 124 | 9 | 10 |
| v | 112 | 113 | 114 | 115 | 116 | 117 | 118 | 119 | 120 | 121 | 122 | 123 | 124 | 125 | 126 | 127 |
| F(v) | 191 | 239 | 243 | 197 | 135 | 20 | 254 | 100 | 222 | 46 | 75 | 26 | 6 | 33 | 107 | 102 |
| v | 128 | 129 | 130 | 131 | 132 | 133 | 134 | 135 | 136 | 137 | 138 | 139 | 140 | 141 | 142 | 143 |
| F(v) | 2 | 245 | 146 | 138 | 12 | 179 | 126 | 208 | 122 | 71 | 150 | 229 | 38 | 128 | 173 | 223 |
| v | 144 | 145 | 146 | 147 | 148 | 149 | 150 | 151 | 152 | 153 | 154 | 155 | 156 | 157 | 158 | 159 |
| F(v) | 161 | 48 | 55 | 174 | 54 | 21 | 34 | 56 | 244 | 167 | 69 | 76 | 129 | 233 | 132 | 151 |
| v | 160 | 161 | 162 | 163 | 164 | 165 | 166 | 167 | 168 | 169 | 170 | 171 | 172 | 173 | 174 | 175 |
| F(v) | 53 | 203 | 206 | 60 | 113 | 17 | 199 | 137 | 117 | 251 | 218 | 248 | 148 | 89 | 130 | 196 |
| v | 176 | 177 | 178 | 179 | 180 | 181 | 182 | 183 | 184 | 185 | 186 | 187 | 188 | 189 | 190 | 191 |
| F(v) | 255 | 73 | 57 | 103 | 192 | 207 | 13 | 184 | 15 | 142 | 66 | 35 | 145 | 108 | 219 | 164 |
| v | 192 | 193 | 194 | 195 | 196 | 197 | 198 | 199 | 200 | 201 | 202 | 203 | 204 | 205 | 206 | 207 |
| F(v) | 52 | 241 | 72 | 194 | 111 | 61 | 45 | 64 | 190 | 62 | 188 | 193 | 170 | 186 | 78 | 85 |
| v | 208 | 209 | 210 | 211 | 212 | 213 | 214 | 215 | 216 | 217 | 218 | 219 | 220 | 221 | 222 | 223 |
| F(v) | 59 | 220 | 104 | 127 | 156 | 216 | 74 | 86 | 119 | 160 | 237 | 70 | 181 | 43 | 101 | 250 |
| v | 224 | 225 | 226 | 227 | 228 | 229 | 230 | 231 | 232 | 233 | 234 | 235 | 236 | 237 | 238 | 239 |
| F(v) | 227 | 185 | 177 | 159 | 94 | 249 | 230 | 178 | 49 | 234 | 109 | 95 | 228 | 240 | 205 | 136 |
| v | 240 | 241 | 242 | 243 | 244 | 245 | 246 | 247 | 248 | 249 | 250 | 251 | 252 | 253 | 254 | 255 |
| F(v) | 22 | 58 | 88 | 212 | 98 | 41 | 7 | 51 | 232 | 27 | 5 | 121 | 144 | 106 | 42 | 154 | ing times of iterations of the digital chaotic system, wherein the first counter provides the controlling module with a first control signal for controlling the digital chaotic system to output, the second counter provides the controlling module with a second control signal for controlling the digital chaotic system to output a state value to the synchronization coupling module, and the third counter provides the controlling module with a third control signal for controlling the disturbance coupling module to disturb the digital chaotic system; and the timing and counting module comprises a first timer and a second timer for timing duration of the continuous chaotic system staying in a running state, wherein the first timer provides the controlling module with a fourth control signal for controlling the synchronization coupling module to output a synchronizing impulse, and the second timer provides the controlling module with a fifth control signal for controlling the disturbance coupling module to sample the continuous chaotic system.

4. The analog-digital mixed chaotic system according to claim 1, further comprising an A/D converting module for converting the continuous chaotic signal generated by the continuous chaotic system into a digital chaotic sequence.

5. The analog-digital mixed chaotic system according to claim 4, further comprising a multiplexing switch for selecting one of three received inputs as an output, the three received inputs are:

the digital chaotic sequence from the digital chaotic system;

the continuous chaotic signal from the continuous chaotic system; and the digital chaotic sequence from the A/D converting module.

6. The analog-digital mixed chaotic system according to claim 5, further comprising a first encoding module and a second encoding module, and wherein, the digital chaotic sequence from the digital chaotic system is outputted to the multiplexing switch after being processed by the first encoding module, the digital chaotic sequence from the A/D converting module is outputted to the multiplexing switch after being processed by the second encoding module, the multiplexing switch selects one of the three inputs from the first encoding module, the second encoding module and the continuous chaotic system as the output of the analog-digital mixed chaotic system.

7. The analog-digital mixed chaotic system according to claim 6, further comprising an encrypting/decrypting module connected to the multiplexing switch, wherein the encrypting/decrypting module configured to encrypt an inputted plaintext and output an encrypted one or configured to decrypt an inputted cipher text and output a decrypted one, according to the output of the multiplexing switch.

8. The analog-digital mixed chaotic system according to claim 7, further comprising:

a first and second data buffers connected to the encrypting/decrypting module and the controlling module, wherein the first data buffer is configured to transmit or receive the cipher text under the control of the controlling module, and the second data buffer is configured to transmit or receive the plaintext under the control of the controlling module, and wherein the encrypting/decrypting module, according to the output of the multiplexing switch, encrypts the plaintext in the second data buffer and output the encrypted one to the first data buffer, or decrypts the cipher text in the first data buffer and outputs the decrypted one to the second data buffer.

9. The analog-digital mixed chaotic system according to claim 8, wherein, the encrypting/decrypting module encrypts the plaintext or decrypts the cipher text according to the encoded digital chaotic sequence generated by the multiplexing switch, or realizes a chaotic synchronization based secure communication according to the continuous chaotic signals from the multiplexing switch.

10. The analog-digital mixed chaotic system according to claim 3, wherein, the synchronization coupling module generates and outputs, according to the state value from the digital chaotic system and the state of the continuous chaotic system, a synchronizing impulse signal to the continuous chaotic module under control of the controlling module, the disturbance coupling module samples the state of the continuous chaotic system under control of the controlling module and the sampled value is output to the digital chaotic system after being converted by a disturbance coupling function.

11. The analog-digital mixed chaotic system according to claim 10, wherein, the operating states of the digital chaotic system are classified into a running state and a holding state, and operating states of the continuous chaotic system are classified into a running state and a holding state; the digital chaotic system output a state value to the synchronization coupling module every time after a predetermined number of times of iterations are completed; the disturbance coupling module disturbs the digital chaotic system every time after the digital chaotic system completes a predetermined number of times of iterations.

12. A method for generating an analog-digital mixed chaotic signal, comprising:

generating a digital chaotic sequence from a digital chaotic system;

generating continuous chaotic signals from a continuous chaotic system;

generating a synchronizing impulse signal for controlling the continuous chaotic system according to states of the digital chaotic system and the continuous chaotic system, and outputting the synchronizing impulse signal to the continuous chaotic system; and disturbing the digital chaotic system according to the state of the continuous chaotic system.

13. The method according to claim 12, further comprising:

recording the operating states of the digital chaotic system and the continuous chaotic system, and outputting a corresponding signal to a controlling module according to the recoding result; and wherein, the generating the digital chaotic sequence from the digital chaotic system and the generating the continuous chaotic signal from the continuous chaotic system are performed under control of the controlling module based on the corresponding signal;

the generating the synchronizing impulse signal for controlling the continuous chaotic system is performed by the synchronization coupling module, under control of the controlling module based on the corresponding signal; and the disturbing the digital chaotic system is performed under control of the controlling module based on the corresponding signal.

14. The method according to claim 13, wherein, the recording the operating states of the digital chaotic system and the continuous chaotic system, and outputting a corresponding signal to the controlling module according to the recorded result comprises:

counting times of iterations of the digital chaotic system, wherein a first counter provides the controlling module with a first control signal for controlling output of the digital chaotic system, a second counter provides the controlling module with a second control signal for controlling the digital chaotic system to output a state value to the synchronization coupling module, and a third counter provides the controlling module with a third control signal for controlling the disturbance coupling module to disturb the digital chaotic system; and timing duration of the continuous chaotic system staying in a running state, wherein a first timer provides the controlling module with a fourth control signal for controlling the synchronization coupling module to output a synchronizing impulse, and a second timer provides the controlling module with a fifth control signal for controlling the disturbance coupling module to sample the continuous chaotic system.

15. The method according to claim 13, further comprising:
converting the continuous chaotic signal generated by the continuous chaotic system into a digital chaotic sequence; and
selecting one of the digital chaotic sequence from the digital chaotic system, the continuous chaotic signal from the continuous chaotic system, and the digital chaotic sequence converted from the continuous chaotic signal, as an output.

16. The method according to claim 13, further comprising:
encoding the digital chaotic sequence generated by the digital chaotic system;
converting the continuous chaotic signal generated by the continuous chaotic system into a digital chaotic sequence, and encoding the digital chaotic sequence converted from the continuous chaotic signal; and
selecting one of the encoded digital chaotic sequence from the digital chaotic system, the continuous chaotic signal from the continuous chaotic system, and the encoded digital chaotic sequence converted from the continuous chaotic signal, as an output.

17. The method according to any one of claim 12, wherein, the synchronizing impulse signal in generating a synchronizing impulse signal for controlling the continuous chaotic system is generated according to state value from the digital chaotic system and the state of the continuous chaotic system; and the disturbing the digital chaotic system comprises sampling the state of the continuous chaotic system, and outputting, after a conversion using a disturbance function, the sampled value to the digital chaotic system so as to disturb the digital chaotic system.

18. An encryption communication system, comprising a transmitting party, and a receiving party configured to communicate with the transmitting party, wherein a first analog-digital mixed chaotic system included in the transmitting party is configured to encrypt a plaintext to be transmitted by using a chaotic signal generated by itself, and outputting a resultant cipher text; and a second analog-digital mixed chaotic system included in the receiving party is configured to decrypt a received cipher text by using a chaotic signal generated by itself, and outputting a resultant plaintext; and wherein, initial conditions and system parameters of the digital chaotic systems in the first and the second analog-digital mixed chaotic systems are substantially the same, and each of the first and the second analog-digital mixed chaotic systems respectively comprises:

a digital chaotic system adapted to generate a digital chaotic sequence;

a continuous chaotic system adapted to generate a continuous chaotic signal;

a synchronization coupling module adapted to generate a synchronizing impulse signal for controlling the continuous chaotic system according to states of the digital chaotic system and the continuous chaotic system, and output the synchronizing impulse signal to the continuous chaotic system;

a disturbance coupling module adapted to disturb the digital chaotic system according to the state of the continuous chaotic system; and a controlling module adapted to control operating states of the digital chaotic system and the continuous chaotic system, and operating states of the synchronization coupling module and the disturbance coupling module.

* * * * *

UNITED STATES PATENT AND TRADEMARK OFFICE
CERTIFICATE OF CORRECTION

PATENT NO. : 8,144,872 B2 Page 1 of 1
APPLICATION NO. : 12/163744
DATED : March 27, 2012
INVENTOR(S) : Hu et al.

It is certified that error appears in the above-identified patent and that said Letters Patent is hereby corrected as shown below:

Column 26, line 14, "bc" should read -- be --.

Signed and Sealed this
Twelfth Day of June, 2012

David J. Kappos
*Director of the United States Patent and Trademark Office*